(12) United States Patent
Carl et al.

(10) Patent No.: US 7,474,809 B2
(45) Date of Patent: *Jan. 6, 2009

(54) IMPLEMENT FOR OPTICALLY INFERRING INFORMATION FROM A JOTTING SURFACE AND ENVIRONMENTAL LANDMARKS

(75) Inventors: Stewart R. Carl, Palo Alto, CA (US); Marek Alboszta, San Francisco, CA (US); Michael J. Mandella, Palo Alto, CA (US); Hector H Gonzalez, Mountain View, CA (US); Timothy Hawks, Menlo Park, CA (US)

(73) Assignee: Electronic Scripting Products, inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/728,951

(22) Filed: Mar. 26, 2007
(Under 37 CFR 1.47)

(65) Prior Publication Data
US 2008/0080791 A1    Apr. 3, 2008

Related U.S. Application Data

(63) Continuation-in-part of application No. 10/640,942, filed on Aug. 13, 2003, now Pat. No. 7,203,384.

(60) Provisional application No. 60/450,244, filed on Feb. 24, 2003.

(51) Int. Cl.
*G06K 9/22* (2006.01)

(52) U.S. Cl. .................. 382/314; 382/188; 382/291
(58) Field of Classification Search ................. 382/314, 382/188, 291; 356/138
See application file for complete search history.

(56) References Cited

U.S. PATENT DOCUMENTS

| 7,203,384 B2* | 4/2007 | Carl ........................... 382/314 |
| 2007/0211239 A1* | 9/2007 | Mandella et al. ............ 356/138 |

* cited by examiner

Primary Examiner—Anh Hong Do
(74) Attorney, Agent, or Firm—ESPi

(57) ABSTRACT

The present invention relates to a jotting implement that infers hand-jotted information from viewing a jotting surface and environmental landmarks. The hand-jotted information is any information marked on the jotting surface as a result of writing, jotting, drawing, sketching or otherwise operating on the jotting surface as well as hand-generated information produced by moving the implement in the air with respect to the jotting surface. The jotting implement has a nib for jotting and an arrangement for determining when the nib is jotting on the jotting surface. Further, the implement has an optical unit for viewing an environmental landmark and the jotting surface. The implement has a processing unit for receiving optical data of the environmental landmark and the jotting surface from the optical unit and determining from the optical data the physical coordinates of the nib with respect to the jotting surface. The environmental landmark is preferably made up several beacons that emit electromagnetic radiation and are affixed to a host structure.

14 Claims, 16 Drawing Sheets

IMPLEMENT FOR OPTICALLY INFERRING INFORMATION FROM A JOTTING SURFACE AND ENVIRONMENTAL LANDMARKS

RELATED APPLICATIONS

This application is a continuation-in-part of U.S. patent application Ser. No. 10/640,942 U.S. Pat. No. 7,203,384 filed on Aug. 13, 2003, which claims priority from U.S. Provisional Patent Application No. 60/450,244 filed on Feb. 24, 2003.

FIELD OF THE INVENTION

The present invention relates generally to acquisition of information written, drawn, sketched or otherwise marked on a jotting or writing surface by a user with the aid of a hand-held implement, such as a writing implement.

BACKGROUND OF THE INVENTION

The art of writing and drawing is ancient and rich in traditions. Over the ages various types of implements have been used for writing down words as well as drawing, sketching, marking and painting. Most of these implements have a generally elongate shape, an essentially round cross-section and they are terminated at one end by a writing nib or tip. They are typically designed to be hand-held and operated by the user's preferred hand (e.g., by the right hand for right-handed persons). More specifically, the user moves the implement across a writing or jotting surface such that the writing nib leaves a visible trace marking its motion on the surface. The marking can be produced by a material deposited from the nib, e.g., through abrasion of the marking material (such as charcoal in the case of a pencil) or by direct wetting of the surface by an ink (as in the case of the pen). The marking can also include any other physical trace left on the surface.

The most widely used writing and drawing implements include pens and pencils while the most convenient jotting surfaces include sheets of paper of various sizes and other generally planar objects capable of being marked. In fact, despite the tremendous advances in sciences and engineering, pen and paper remain among the simplest and most intuitive devices for writing, drawing, marking and sketching even in the electronic age.

The challenge of communicating with electronic devices is in the very input interface to the electronic device. For example, computers take advantage of input devices such as keyboards, buttons, pointer devices, mice and various other types of apparatus that encode motion and convert it to data that the computer can process. Unfortunately, none of these devices are as user-friendly and accepted as pen and paper.

This input interface problem has been recognized in the prior art and a variety of solutions have been proposed. Most of these solutions attempt to derive electronic, i.e., digital data from the motions of a pen on paper or some other writing surface, e.g., a writing tablet. Of these prior art teachings the following references are of note:

U.S. Patents:

| | | | | |
|---|---|---|---|---|
| 4,471,162 | 4,896,543 | 5,103,486 | 5,215,397 | 5,226,091 |
| 5,294,792 | 5,333,209 | 5,434,371 | 5,484,966 | 5,517,579 |
| 5,548,092 | 5,661,506 | 5,577,135 | 5,581,276 | 5,587,558 |
| 5,587,560 | 5,652,412 | 5,661,506 | 5,717,168 | 5,737,740 |
| 5,750,939 | 5,774,602 | 5,781,661 | 5,902,968 | 5,939,702 |
| 5,959,617 | 5,960,124 | 5,977,958 | 6,031,936 | 6,044,165 |
| 6,050,490 | 6,081,261 | 6,100,877 | 6,104,387 | 6,104,388 |
| 6,108,444 | 6,111,565 | 6,124,847 | 6,130,666 | 6,147,681 |
| 6,153,836 | 6,177,927 | 6,181,329 | 6,184,873 | 6,188,392 |
| 6,213,398 | 6,243,503 | 6,262,719 | 6,292,177 | 6,330,359 |
| 6,334,003 | 6,335,723 | 6,335,724 | 6,335,727 | 6,348,914 |
| 6,396,481 | 6,414,673 | 6,421,042 | 6,422,775 | 6,424,340 |
| 6,429,856 | 6,437,314 | 6,456,749 | 6,492,981 | 6,498,604 |

U.S. Published Applications:

| | | | | |
|---|---|---|---|---|
| 2002-0001029 | 2002-0028017 | 2002-0118181 | 2002-0148655 | 2002-0158848 |
| 2002-0163511 | | | | |

European Patent Specifications: 0,649,549 B1
International Patent Applications:

| | | | |
|---|---|---|---|
| WO 02/017222 A2 | WO 02/058029 A2 | WO 02/064380 A1 | WO 02/069247 A1 |
| WO 02/084634 A1 | | | |

Although the above-referenced teachings provide a number of approaches they are cumbersome to the user. Many of these approaches provide the user with pens that are difficult to handle, impose special writing and/or monitoring conditions and/or they require cumbersome auxiliary systems and devices to track and digitize the information written on the writing surface. Thus, the problem of a user-friendly input interface based on a writing implement has not been solved.

SUMMARY OF THE INVENTION

The present invention provides a jotting implement for inferring information that is hand-jotted on a jotting surface. For the purposes of this invention, hand-jotted information comprises any information marked on the jotting surface as a result of any of the following actions: writing, jotting, drawing, sketching or in any other manner marking or depositing marks on the jotting surface. Additionally, hand-jotted information for the purposes of this application also means information traced on the jotting surface without leaving any markings.

The jotting implement has a nib for jotting and an arrangement for determining when the nib is jotting on the jotting surface. Further, the implement has an optical unit for viewing an environmental landmark and the jotting surface. The optical unit is indexed to the nib. For the purposes of this invention indexed to the nib means that the optical axis of the optical unit is referenced to the nib, for example, the optical axis of the optical unit can be indexed by passing through the nib.

The implement has a processing unit for receiving optical data of the environmental landmark and the jotting surface from the optical unit. The processing unit determines from the optical data the physical coordinates of the nib with respect to the jotting surface. In other words, the processing unit uses the optical data to determine the location on the nib in relationship to the jotting surface.

The environmental landmark is preferably made up of one or more beacons that emit electromagnetic radiation. It is further preferred, that the one or more beacons be affixed to a host structure. The host structure can be a computing device, a communication device, a clip-board, a tablet PC, a graphic tablet or other workspace device. In some embodiments, the host structure can bear, incorporate, be a part of or be positioned in a certain relationship to the jotting surface. In these embodiments it is particularly advantageous that the one or more beacons be positioned in well-defined relationships, i.e., indexed to the jotting surface. When the host structure has a screen the one or more beacons can be affixed behind the screen in order to be unobtrusive to the user. It should be noted that the screen itself can be the jotting surface in these embodiments.

The beacons can be placed in various patterns. They may, for example, be confined to a single plane—e.g., a plane that is perpendicular to, co-planar with or parallel to the jotting surface. Alternatively, the beacons can be placed in a three-dimensional arrangement—e.g., at the corners of the host structure. Of course, the beacons do not need to be placed on the host structure at all, and may instead be located on a separate object or objects. When using three-dimensional arrangements of beacons it is preferred that the arrangement be a Manhattan-arrangement.

The beacons can be various light emitting elements that are spatially extended or point-source type. They can also emit the electromagnetic radiation at any suitable wavelength or wavelengths, including infrared. A light-emitting-diode is a good candidate for a beacon in accordance with the present invention.

The invention further extends to jotting implements for inferring hand-generated information with respect to a jotting surface. In these embodiments the jotting implement has a nib for jotting, an arrangement for determining when the nib is jotting on the jotting surface and an optical unit indexed to the nib for viewing an environmental landmark and the jotting surface. A processing unit is provided for receiving the optical data captured by the optical unit from the environmental landmark (e.g., in the form of one or more beacons) and the jotting surface. The processing unit uses the optical data for determining the physical coordinates of the nib with respect to the jotting surface.

Preferably, when the nib is jotting on the jotting surface the hand-generated information is rendered into a trace (sometimes also called digital ink). On the other hand, when the nib is in the air, i.e., when the nib is not jotting on the jotting surface, the hand-generated information is rendered into a pointer location projected onto the jotting surface. It should be noted that the mode in which the pointer location is projected can be absolute or quasi-absolute. In the quasi-absolute mode, the pointer location is absolute with respect to the one or more beacons but may be relative with respect to the jotting surface.

It should be noted that in contrast to the prior art the implement of the invention infers the physical coordinates of the nib indirectly, i.e., from the optical data of the jotting surface and the environmental landmark obtained from the optical unit. Any optical data about the jotting surface sufficient to make the determination of the physical coordinates of the nib can be used. For example, optical data of all corners or a number of corners, edges or portions thereof can be used. Alternatively, landmarks or any optically recognizable features on the jotting surface can be used as well.

The details of the invention will now be explained in the attached detailed description with reference to the attached drawing figures.

DETAILED DESCRIPTION

Figure 1:
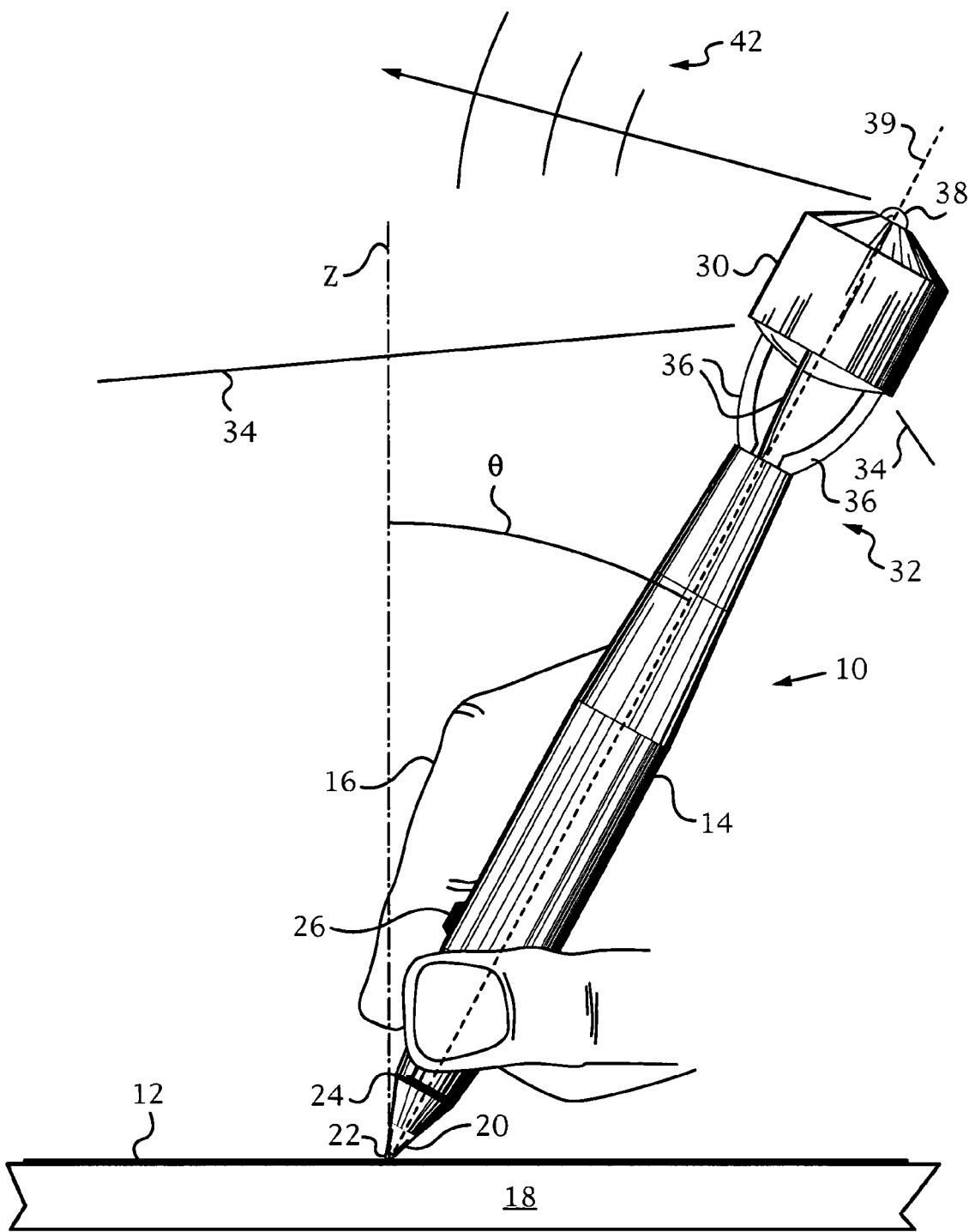
FIG. 1 is a side view of a jotting implement in accordance with the invention where the jotting implement is shown in the plane of an inclination angle $\theta$ (Euler angle $\theta$).
Figure 2:
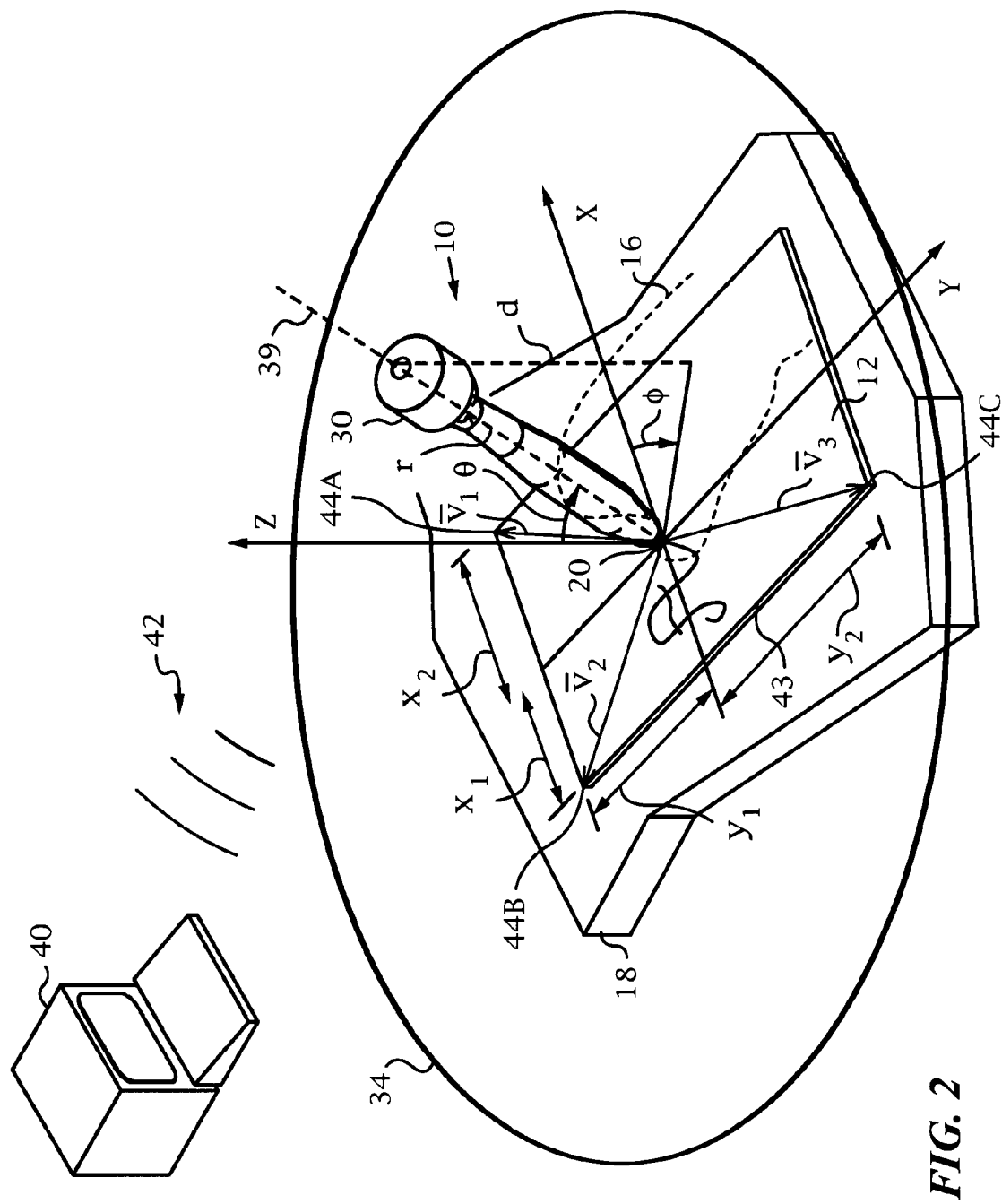
FIG. 2 is a three-dimensional diagram illustrating the physical parameters of the jotting implement of FIG. 1 when in use.
Figure 3:
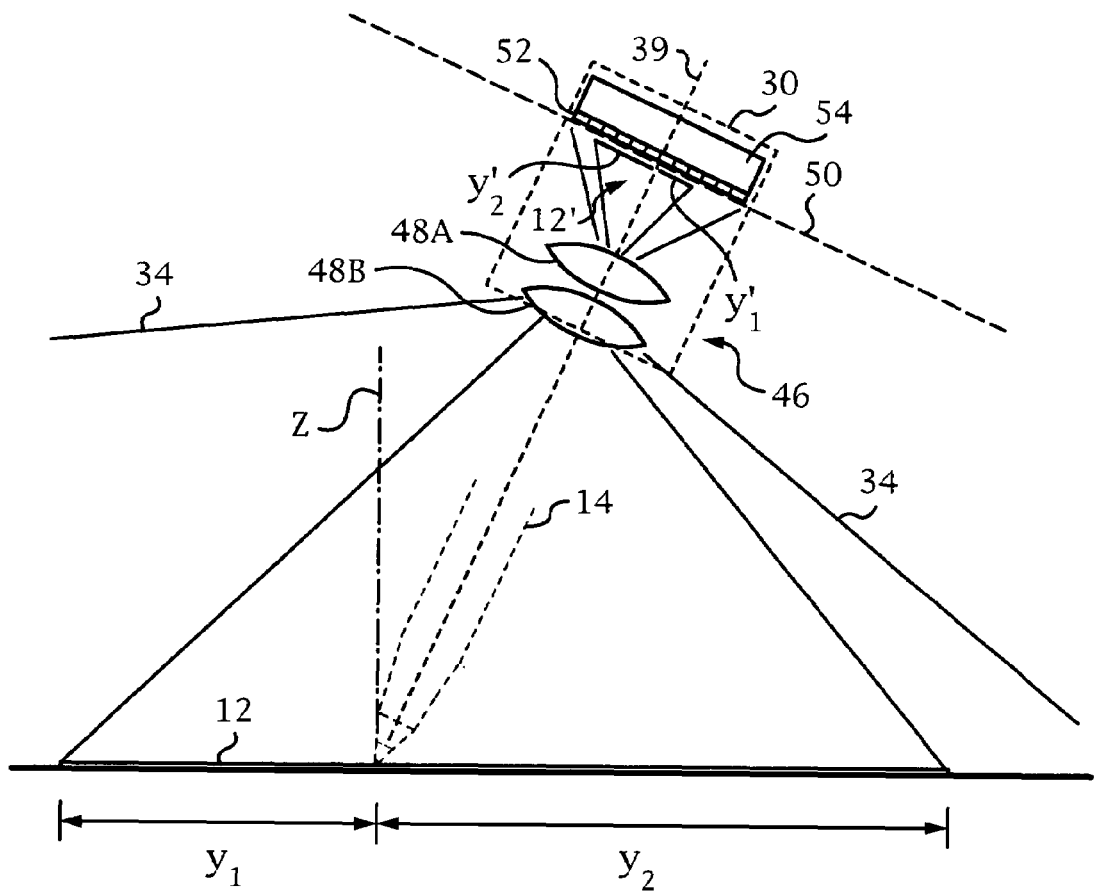
FIG. 3 is a plan side view of the jotting implement of FIG. 1 illustrating the principle of imaging.
Figure 4:
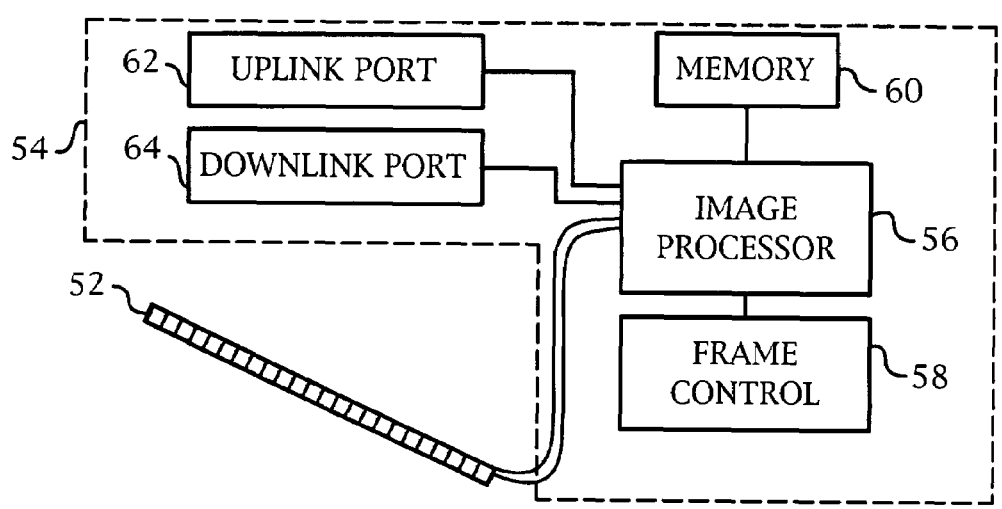
FIG. 4 is a block diagram of the processing unit of the jotting implement of FIG. 1.

The present invention will be best understood by initially referring to the side view of FIG. 1 illustrating a jotting implement 10 in accordance with the invention and the diagrams of FIGS. 2 through 4. Jotting implement 10 shown in FIG. 1 is a pen, more specifically an ink pen, and still more precisely a ball-point pen. However, it will be appreciated that jotting implement 10 can be a marker, a pencil a brush or indeed any other writing, sketching, drawing or painting implement that can jot information on a jotting surface 12. Alternatively, jotting implement 10 can also be stylus or any device that jots information on jotting surface 12 by tracing that information without leaving any permanent markings or deformations on the jotting surface. Such jotting surface can include a pressure-sensitive digitizing tablet or any other surface provided specifically for input into an electronic data processing device. In the present embodiment jotting implement has a shape generally resembling known writing, sketching, drawing or painting devices. Specifically, jotting implement 10 has an elongate body 14 of generally round cross-section designed to be held in a user's hand 16.

In general, jotting surface 12 is a sheet of planar material on which implement 10 can perform a jotting function as defined above. For geometrical reasons, it is preferable that jotting surface 12 be rectangular. In the present embodiment jotting surface 12 is a sheet of paper of any standard or non-standard dimensions laying flat on a support surface 18. In cases where jotting surface 12 is a digitizing tablet such as a tablet of a PDA device, a computer screen or any other sturdy surface then support surface 18 may not be required. It is important, however, that jotting surface 12 have optically recognizable features such as corners, edges, landmarks or the like. It is also important that these features not change their position with respect to the remainder of jotting surface 12 during the jotting operation.

Implement 10 has a nib 20 terminating in a ball-point 22. A pressure sensor 24 is mounted proximate nib 20 for determining when nib 20 is jotting. Jotting occurs when ball-point 22 is in contact with jotting surface 12. Conveniently, pressure sensor 24 is a strain gauge. Alternatively, pressure sensor 24 is a mechanical pressure sensor or a piezoelectric element. A person skilled in the art will recognize that other pressure sensors can also be used. Implement 10 also has an initialization switch 26. Switch 26 is provided for the user to communicating whether jotting is occurring on the same jotting surface 12 or on a new jotting surface (not shown).

An optical unit 30 is mounted at a distal end 32 of implement 10. Optical unit 30 is designed for viewing jotting surface 12 and it has a field of view 34 demarked by a delimiting line that extends beyond jotting surface, as described in more detail below. In the present embodiment optical unit 30 is mounted on three support members 36. Members 36 can have any construction that ensures mechanical stability and obstructs a negligible portion of field of view 34. Optical unit 30 has an optical axis 39 that is indexed to nib 20. More specifically, optical axis 39 passes through nib 20. Thus, field of view 34 of optical unit 30 is centered on nib 20. Alternatively, optical axis 39 can be indexed to nib 20 at some predetermined offset. For reasons of symmetry of field of view 34, however, it is preferred that optical unit 30 be indexed to nib 20 by passing optical axis 39 through nib 20 and through the center of ball-point 22.

Implement 10 has a device 38 for communicating with an external unit 40 (see FIG. 2). In the present embodiment device 38 is an infra-red (IR) port for transmitting and receiving data encoded in IR radiation 42. Of course, any type of data transmission port including but not limited to ultrasound ports or optical ports can be used as device 38. Meanwhile, external unit 40 can be a computer, a hand-held device, a network terminal, a downloading unit, an electronic gateway into a wide area network (WAN) (e.g., the internet) or a local area network (LAN), a storage device, a printer or any other external unit which can store, print, relay and/or further process the physical coordinates of nib 20.

Referring now to FIG. 2, the physical parameters of implement 10 are conveniently described in terms of a Cartesian coordinate system and a polar coordinate system. The origins of these coordinate systems coincide at the position of nib 20 and more specifically at the position where ball-point 22 contacts jotting surface 12. The Cartesian system has its X- and Y-axes in the plane of jotting surface 12 and aligned with the width and length of jotting surface 12. The Z-axis of the Cartesian system is perpendicular or normal to the plane of jotting surface 12.

A number of features 44A, 44B, 44C are defined by corresponding vectors $v_1$, $v_2$, $v_3$ drawn from the origin of the Cartesian system. In the present case features 44A, 44B, 44C are three corners of jotting surface 12. Alternatively, features 44 can include any edge 43 of jotting surface 12 or any other optically recognizable landmark or feature of jotting surface 12. It should be noted that features produced on jotting surface 12 by the user, including any marks jotted by implement 10, are legitimate features for this purpose.

The polar coordinate system is used to define the orientation of implement 10 with respect to jotting surface 12. The Z-axis of the polar system is coincident with the Z-axis of the Cartesian system. Since optical axis 39 is indexed to nib 20 it passes through the origins of the two coordinate systems. Thus, in the polar system optical axis 39 defines the polar coordinate r and the length of r, i.e., |r| is the length of implement 10. The inclination of implement 10 with respect to the Z-axis is expressed by polar angle θ, hereafter referred to as inclination angle θ. The angle of rotation of implement 10 about the Z-axis is expressed by polar angle φ.

It is preferred that optical unit 30 be an imaging unit, as shown in the plan view of FIG. 3. Specifically, optical unit 30 is preferably an imaging unit capable of imaging objects present in its field of view 34 and in particular imaging jotting surface 12 with relatively low distortion. In the present embodiment imaging unit 30 has a refractive imaging optics 46 indicated by lenses 48A, 48B. It will be appreciated by a person skilled in the art that suitable refractive imaging optics 46 include lenses which afford a wide field of view with good off-axis optical performance, such as fish-eye lenses or wide-field-of-view lenses. For more specifics on such types of lenses the reader is referred to U.S. Pat. Nos. 4,203,653; 4,235,520; 4,257,678 as well as the article by James "Jay" Kumler et al., "Fisheye lens designs and their relative performance", SPIE, all of which are herein incorporated by reference.

Imaging optics 46 define an image plane 50 as indicated by the dashed line. Imaging unit 30 is further equipped with a photodetector array 52 positioned in image plane 50. An image 12' of jotting surface 12 is projected onto array 52 by imaging optics 46. Preferably, array 52 is a CMOS photodetector array. Of course, other types of photodetector arrays including arrays employing photodiodes or phototransitors of various types can be used as photodetector array 52. A CMOS photodetector array, however, tends to be more efficient, responsive and it tends to consume less power. In addition CMOS arrays have a small pitch thus enabling high resolution.

Field of view 34 afforded by optics 46 is substantially larger than the area of jotting surface 12. In fact, field of view 34 is large enough such that image 12' of entire jotting surface 12 is always projected onto array 52. This condition holds for any jotting position that may be assumed by jotting implement 10 during a jotting operation performed by the user, such as writing near an edge or corner of jotting surface 12 at a maximum possible inclination angle θ (e.g., θ≈40°). Thus, forward and backward portions $y_1$, $y_2$ of jotting surface 12 are always imaged on array 52 as portions $y'_1$, $y'_2$ as long as not obstructed by user's hand 16 or by other obstacles.

It is noted that for purposes of clarity primed reference numbers are used herein to denote parts in image space corresponding to parts bearing the same but unprimed reference numbers in physical space. As additional transformations and operations are applied to parts in the image space, more primes are added to the reference numbers.

Jotting implement 10 has a processing unit 54, which is illustrated in more detail in FIG. 4. Processing unit 54 is designed for receiving optical data of jotting surface 12. In this embodiment the optical data is represented by image 12' of jotting surface 12. From this optical data processing unit 54 determines the physical coordinates of nib 20 with respect to at least one corner and at least one edge of jotting surface 12. In the present embodiment processing unit 54 is designed to determine vectors $v_1$, $v_2$, $v_3$ in the Cartesian coordinate system defined in FIG. 2.

Figure 5:
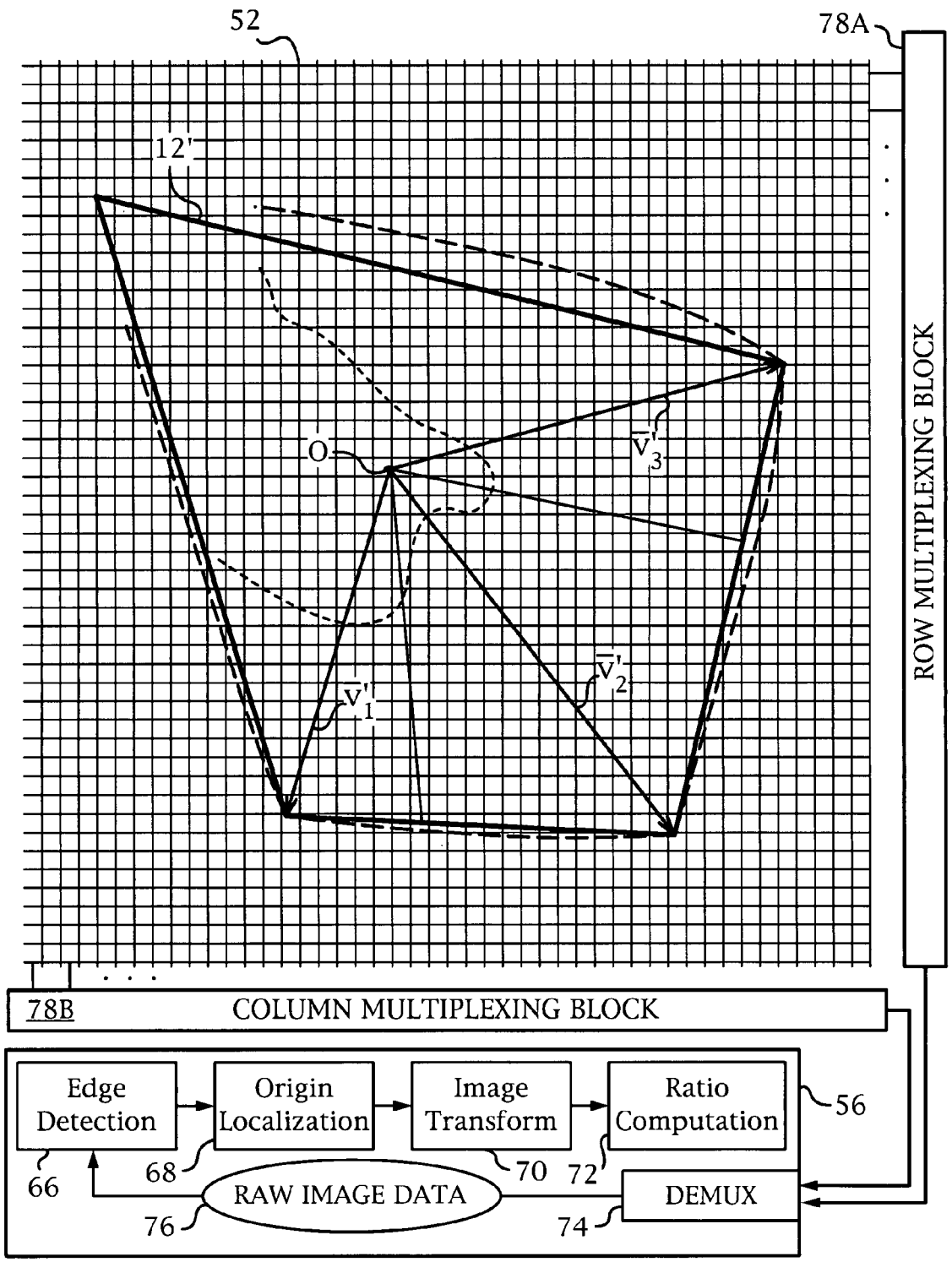
FIG. 5 is a diagram illustrating the image of the jotting surface projected onto a photodetector array belonging to the imaging unit.

To achieve its function processing unit 54 is equipped with an image processor 56, a frame control 58, a memory 60 as well as an uplink port 62 and a downlink port 64. Ports 62, 64 belong to communication device 38. Image processor 56 preferably includes an edge detection unit 66, an origin localization unit 68, an image transformation unit 70 and a ratio computation unit 72, as better shown in FIG. 5. In addition to these elements, image processor 56 has a demultiplexer 74 for receiving and demultiplexing raw image data 76 containing image 12'. Data 76 is delivered from the row 78A and column 78B multiplexing blocks of array 52.

During operation, the user moves implement 10. Once nib 20 of implement 10 is brought in contact with jotting surface 12 pressure sensor 24 activates the acquisition mode of optical unit 30. In the acquisition mode processing unit 54 receives optical data i.e. image 12' of jotting surface 12 as imaged on the pixels of array 52.

Now, image processor 56 captures raw image data 76 of image 12' at a certain frame rate. The frame rate is controlled by frame control 58. The frame rate is fast enough to accurately track the jotting activity of the user. To achieve this the frame rate is set by frame control 58 at 15 Hz or even at 30 Hz or higher.

In contrast with the prior art, the information jotted by the user is not determined by inspecting or imaging the information itself. Rather, the jotted information is inferred by determining the physical coordinates of nib 20 or, more precisely of ball-point 22 with respect to optically recognizable features of jotting surface 12. These recognizable features can include corners, edges or any other landmarks or features produced by the user on jotting surface 12. To determine all information jotted by the user the physical coordinates of nib 20 with respect to the recognizable features are acquired at the set frame rate whenever the acquisition mode is activated by pressure sensor 24.

In the present embodiment, the physical coordinates of nib 20 are determined with respect to three corners 44A, 44B and 44C of jotting surface 12 parametrized with the aid of vectors $v_1$, $v_2$ and $v_3$ (see FIG. 2). To accomplish this goal, processing unit 54 recovers vectors $v_1$, $v_2$, and $v_3$ from imaged vectors $v'_1$, $v'_2$ and $v'_3$ of image 12' (see FIG. 5). This process requires a number of steps.

Figure 6:
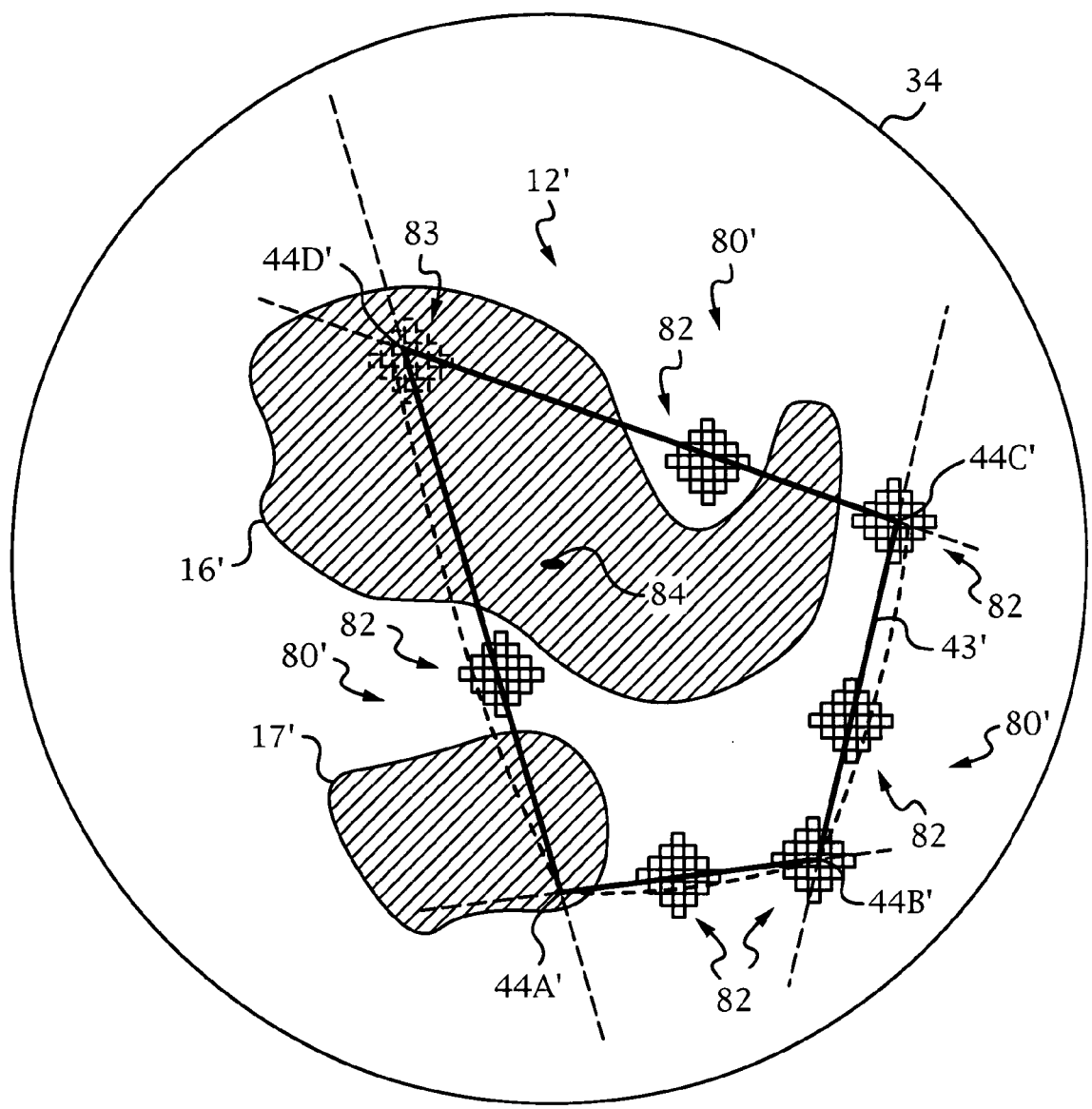
FIG. 6 is a diagram illustrating the process of edge and/or corner detection applied to the image of the jotting surface.

In a first step image processor 56 of processing unit 54 demultiplexes raw image data 76 from row and column blocks 78A, 78B of array 52 with the aid of demultiplexer 74. Next, image processor 56 sends image data 76 to edge detection unit 66. Edge detection unit 66 identifies the edges and corners of image 12' of jotting surface 12. This process is better illustrated in FIG. 6 where unobstructed portions 80' of imaged edges 43' are used for edge detection. For more information on edge detection in images and edge detection algorithms the reader is referred to U.S. Pat. Nos. 6,023,291 and 6,408,109 and to Simon Baker and Shree K. Nayar, "Global Measures of Coherence for Edge Detector Evaluation", Conference on Computer Vision and Pattern Recognition, June 1999, Vol. 2, pp. 373-379 and J. Canny, "A Computational Approach to Edge Detection", IEEE Transactions on Pattern Analysis and Machine Intelligence, Vol. 8, No. 6, November 1986 for basic edge detection all of which are herein incorporated by reference.

In practice, user's hand 16 is an obstruction that obscures a portion of jotting surface 12. Hence, a corresponding shadow 16' is present in image 12'. Another shadow 17' (or a number of shadows) will frequently be produced by other objects covering jotting surface 12 or located between jotting surface 12 and optical unit 30. Such objects typically include the user's other hand and/or body parts such as hair (not shown). For the purposes of the present invention it is only necessary that image 12' have a few unobstructed portions 80' of imaged edges 43', preferably including two or more corners, e.g., 44A', 44B' and 44C' to enable recovery of vectors $v_1$, $v_2$ and $v_3$ and consequent determination of the physical coordinates of nib 20.

Thus, despite shadows 16' and 17' several unobstructed portions 80' of imaged edges 43' are available to edge detection unit 66. A number of pixel groups 82 whose optical data 76 can be used by edge detection unit 66 for edge detection purposes are indicated. It should be noted that in some circumstances a pixel group 83 which is obscured by a shadow, e.g., by shadow 16' may become visible and can then be used to detect corner 44D'.

Edge detection unit 66 recognizes edges 43' and describes them in terms of their vector equations or other suitable mathematical expressions with reference to a center 84 of field of view 34. In order to serve as reference, center 84 is set with the aid of origin localization unit 68. This can be performed prior to operating jotting implement 10, e.g., during first initialization and testing of jotting implement 10 and whenever re-calibration of origin location becomes necessary due to mechanical reasons. The initialization can be performed with the aid of any suitable algorithm for fixing the center of an imaging system. For further information the reader is referred to Carlo Tomasi and John Zhang, "How to Rotate a Camera", Computer Science Department Publication, Stanford University and Berthold K. P. Horn, "Tsai's Camera Calibration Method Revisited", which are herein incorporated by reference and attached as appendices hereto.

In accordance with the invention center 84 coincides with optical axis because optical unit 30 is indexed to nib 20. Hence, for any orientation of jotting implement 10 in physical space, i.e., for any value of inclination angle θ and polar angle φ, center 84 of field of view 34 is always coincident with the position of nib 20 and its image 20'. Systems having this property are commonly referred to as central systems in the art and they include various types of central panoramic systems and the like. It should be noted that image 20' of nib 20 is not actually visible in field of view 34, because body 14 of jotting implement 10 obscures center 84 at all times.

Due to optical effects including aberration associated with imaging optics 46, the detected portion of image 12' will exhibit a certain amount of rounding of edges 43', as indicated in dashed lines. This rounding can be compensated optically by lenses 48A, 48B and/or by any additional lenses (not shown) as well as electronically by processing unit 54. Preferably, the rounding is accounted for by applying a transformation to detected portion of image 12' by image transformation unit 70. For example, image transformation unit 70 has an image deformation transformer based on a plane projection to produce a perspective view. Alternatively, image transformation unit 70 has an image deformation transformer based on a spherical projection to produce a spherical projection. Advantageously, such spherical projection can be transformed to a plane projection with the aid of well-known methods, e.g., as described by Christopher Geyer and Kostas Daniilidis, "A Unifying Theory for Central Panoramic Systems and Practical Implications", www.cis.upenn.edu, Omid Shakernia, et al., "Infinitesimal Motion Estimation from Multiple Central Panoramic Views", Department of EECS, University of California, Berkeley, and Adnan Ansar and Kostas Daniilidis, "Linear Pose Estimation from Points or Lines", Jet Propulsion Laboratory, California Institute of Technology and GRASP Laboratory, University of Pennsylvania which are herein incorporated by reference and attached as appendices hereto.

Now, once image 12' is recognized and transformed the orientation of jotting implement 10 is determined. This can be done in a number of ways. For example, when working with the spherical projection, i.e., with the spherical projection of unobstructed portions image 12', a direct three-dimensional rotation estimation can be applied to recover inclination angle θ and polar angle φ. For this purpose a normal view of jotting surface 12 is stored in memory 60, such that it is available to transformation unit 70 for reference purposes. The transformation then yields the Euler angles of jotting implement 10 with respect to jotting surface 12 by applying the generalized shift theorem. This theorem is related to the Euler theorem stating that any motion in three-dimensional space with one point fixed (in this case the point where nib 20 is in contact with jotting surface 12 is considered fixed for the duration of each frame) can be described by a rotation about some axis. For more information about the shift theorem the reader is referred to Ameesh Makadia and Kostas Daniilidis, "Direct 3D-Rotation Estimation from Spherical Images via a Generalized Shift Theorem", Department of Computer and Information Science, University of Pennsylvania, which is herein incorporated by reference.

Alternatively, when working with a plane projection producing a perspective view of unobstructed portions of image 12' one can use standard rules of geometry to determine inclination angle θ and polar angle φ. Several geometrical methods taking advantage of the rules of perspective views can be employed in this case.

Figure 7A:
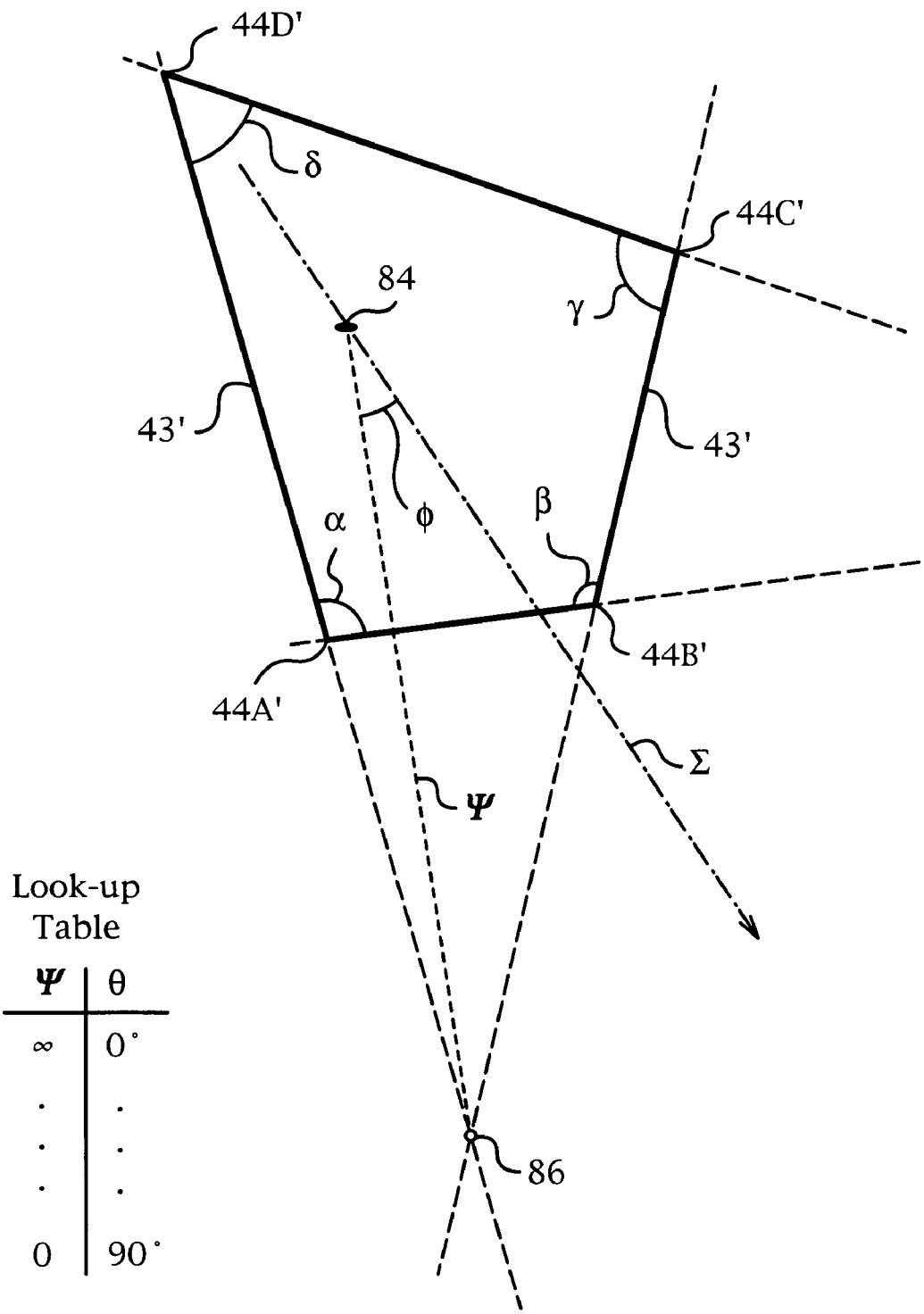
FIG. 7A-D are diagrams illustrating the functions performed by the processing unit on the image to determine the orientation of the jotting implement with respect to the jotting surface in terms of Euler angles.
Figure 8:
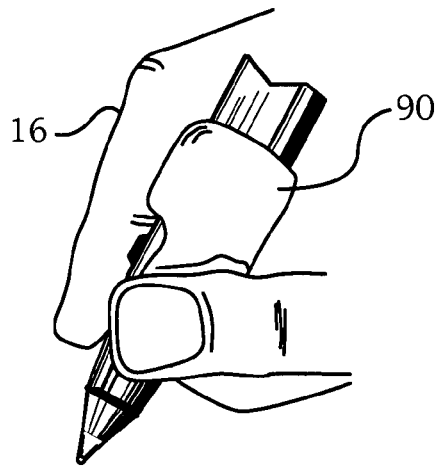
FIG. 8 is a side view illustrating an alternative embodiment of a jotting implement having an orienting grip.

One geometrical method is shown in FIG. 7A, where entire image 12' is shown for clarity (disregarding obstructed portions or filling them in with equations of edges 43' derived in the above step), two edges 43' are extended to vanishing point 86. A connecting line Ψ from center 84 to vanishing point 86 is constructed. A line Σ in the plane of inclination angle θ is also constructed. Now, the angle between lines Ψ and Σ is equal to polar angle φ. Meanwhile, the length of line Ψ from center 84 to vanishing point 86 is inversely proportional to inclination angle θ. Preferably, a look-up table with values of Ψ corresponding to values of inclination angle θ is stored in memory 60 to facilitate rapid identification of angle θ during each frame. It should be noted that in order to keep track of the plane of inclination angle θ rotation of jotting implement 10 around optical axis 39 has to be known. This rotation can be established by providing a key e.g., in the form of a grip 90 on jotting implement 10, as shown in FIG. 8. Grip 90 forces hand 16 of the user to hold jotting implement without rotating it around axis 39.

Figure 7B:
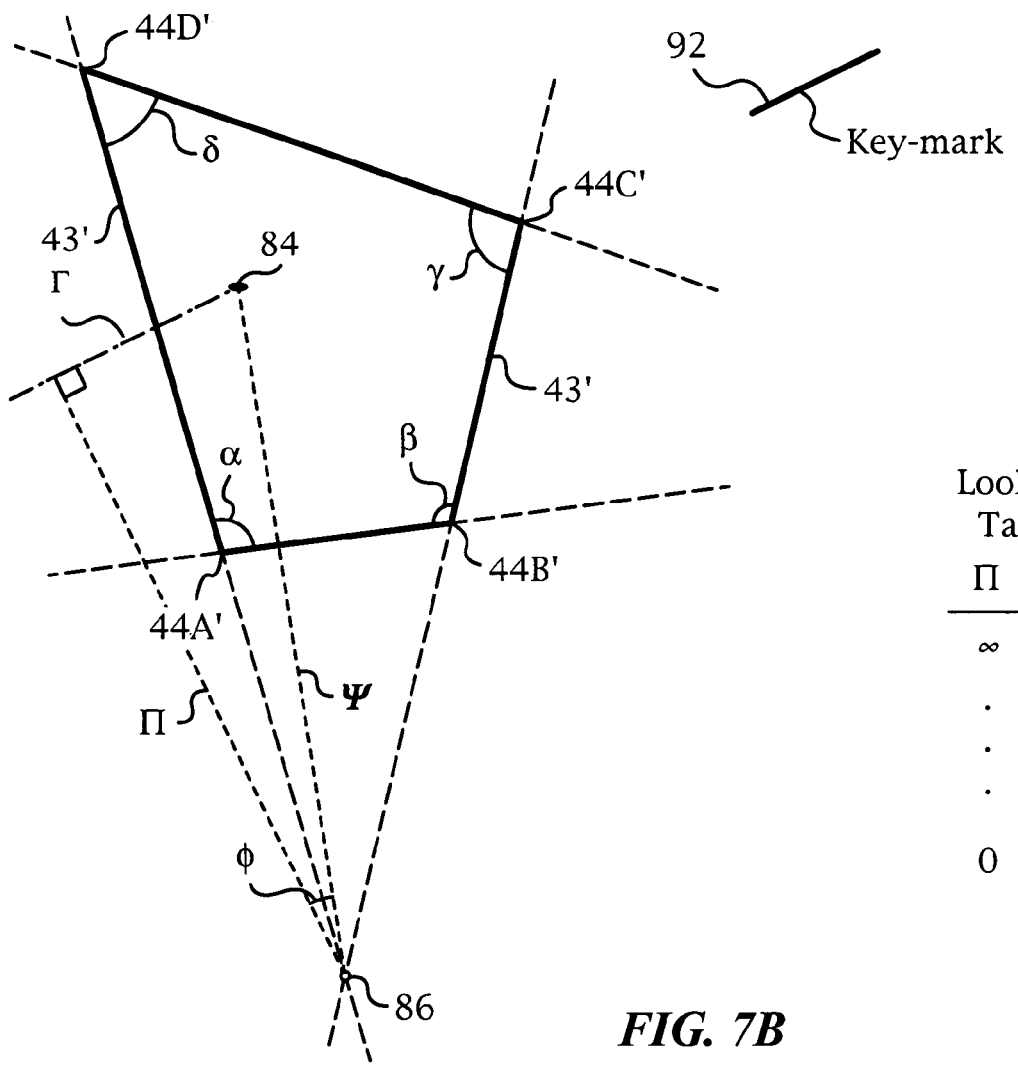

Another geometrical method is shown in FIG. 7B, where entire image 12' is once again shown for clarity. Here, again, two edges 43' are extended to vanishing point 86. A connecting line Ψ from center 84 to vanishing point 86 is constructed. A line Γ in the plane perpendicular to the plane of inclination angle θ is also constructed. Now, a line Π is constructed from vanishing point 86 and perpendicular to line Γ. The angle between lines Π and Ψ is equal to polar angle φ. Meanwhile, the length of line Π from intercept with line Γ to vanishing point 86 is inversely proportional to inclination angle θ. Preferably, a look-up table with values of Π corresponding to values of inclination angle θ is stored in memory 60 to facilitate rapid identification of angle θ during each frame. In this embodiment a key-mark 92 on array 52 or on some other part of jotting implement 10 is used to keep track of the plane perpendicular to the plane of inclination angle θ and it is indexed to an appropriate grip on the pen, e.g., as the one shown in FIG. 8.

Figure 7C:
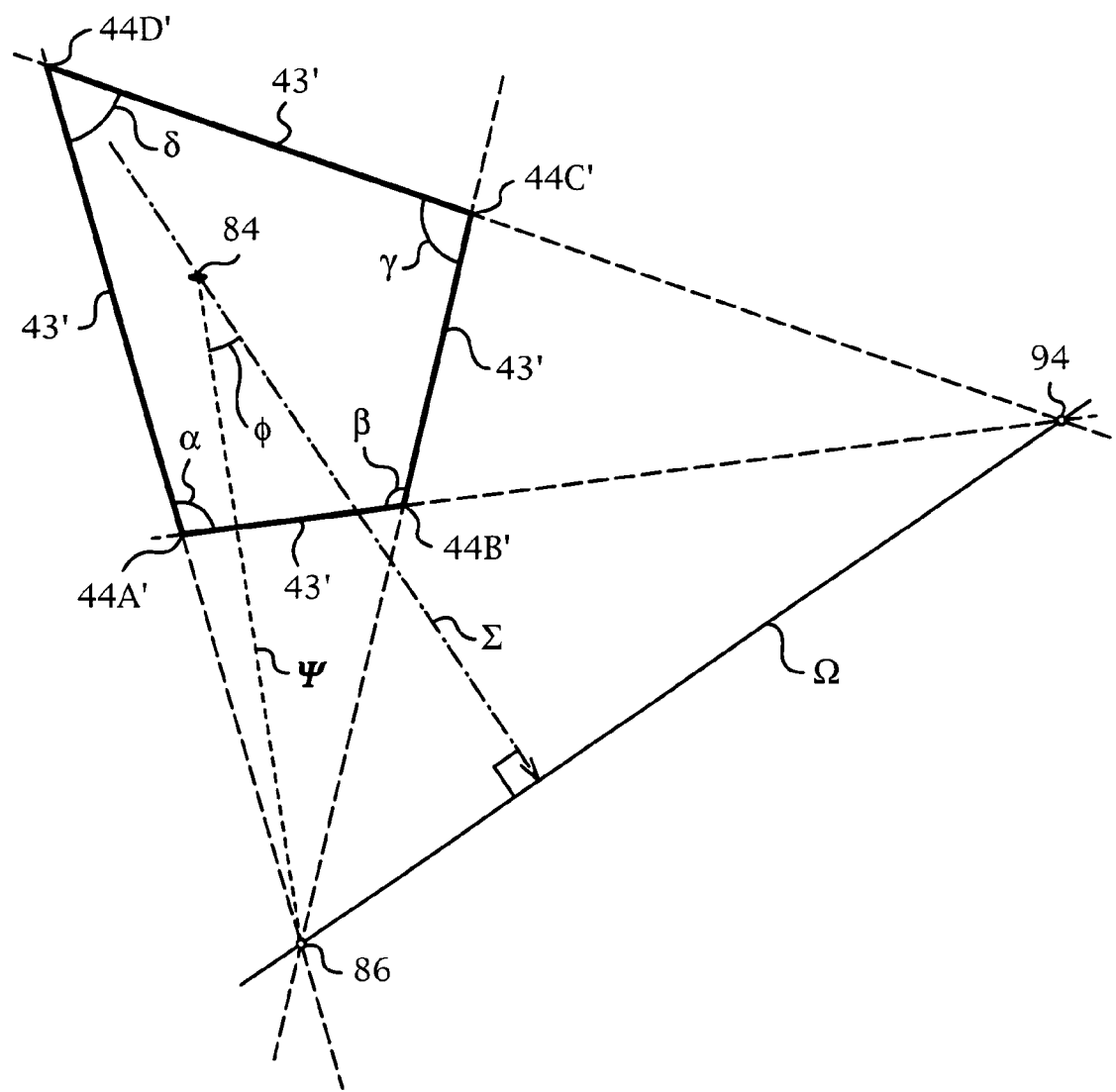

Yet another geometrical method is shown in FIG. 7C based on entire image 12'. Here, connecting line Ψ is constructed from center 84 to vanishing point 86 defined by two edges 43'. A second vanishing point 94 is located by extending the other two edges 43'. Second vanishing point 94 is then joined by line Ω with vanishing point 86. Line Σ is now constructed from center 84 to line Ω such that it intersects line Ω at a right angle. The angle between lines Ψ and Σ is equal to polar angle φ and either the length of line Ψ or the length of line Σ (or even the length of line Ω) can be used to derive inclination angle θ. Once again, the use of corresponding look-up tables is recommended for rapid processing. It should be noted that this embodiment does not require the use of a key-mark or grip since rotation of jotting implement 10 around optical axis 39 (which is also the center axis of jotting implement 10) does not affect this geometrical construction.

Figure 7D:
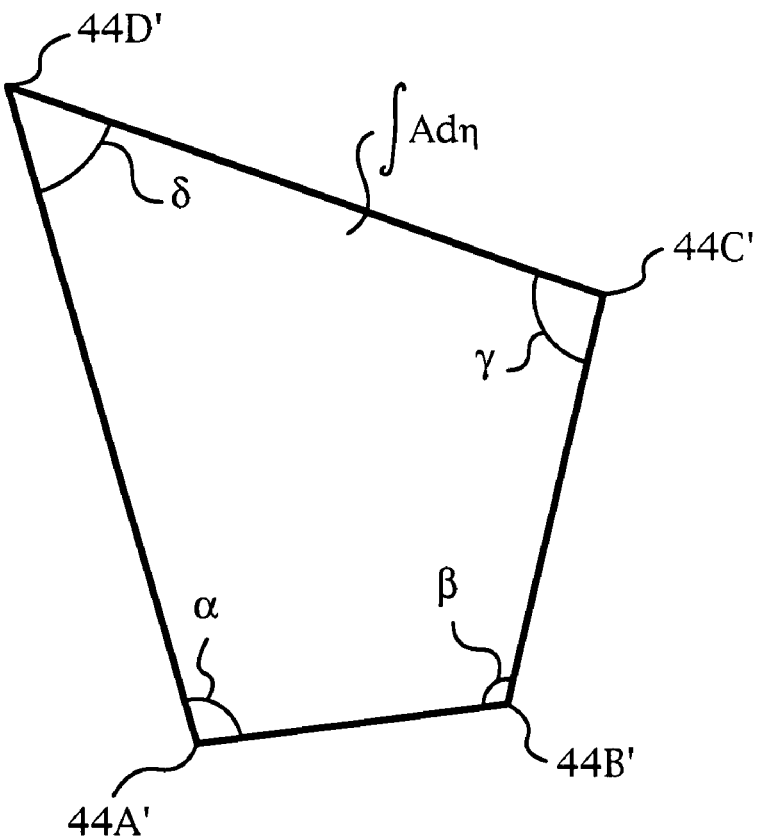

Still another geometrical method is shown in FIG. 7D. In this case corner angles α, β, γ and δ (when unobstructed) as well as the area integral of image 12' are used to determine θ and φ. Specifically, the values of corner angles α, β, γ and δ uniquely define angle φ. Likewise, the values of the area integral uniquely define θ. Corresponding look-up tables stored in memory 60 can be used for rapid processing and determination of angles θ, φ in this embodiment.

Figure 9:
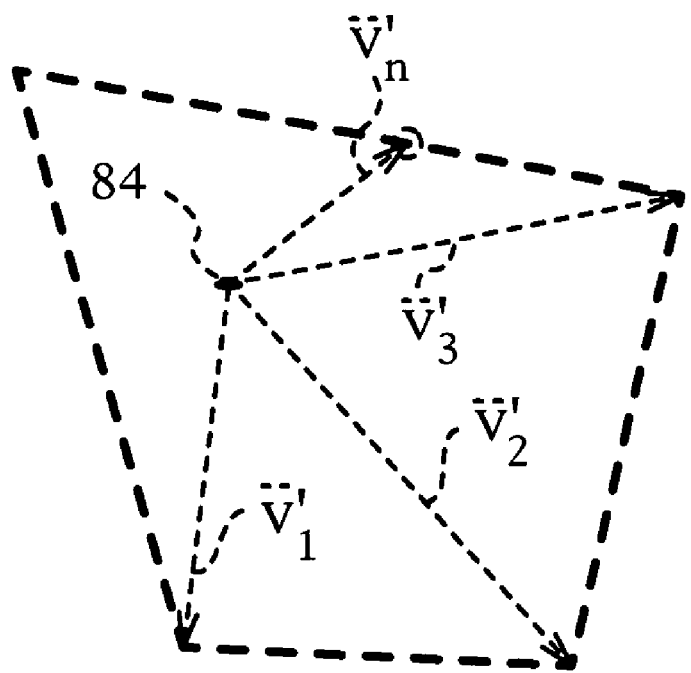
FIG. 9 is a diagram illustrating the process of image correction and parametrization.
Figure 9:
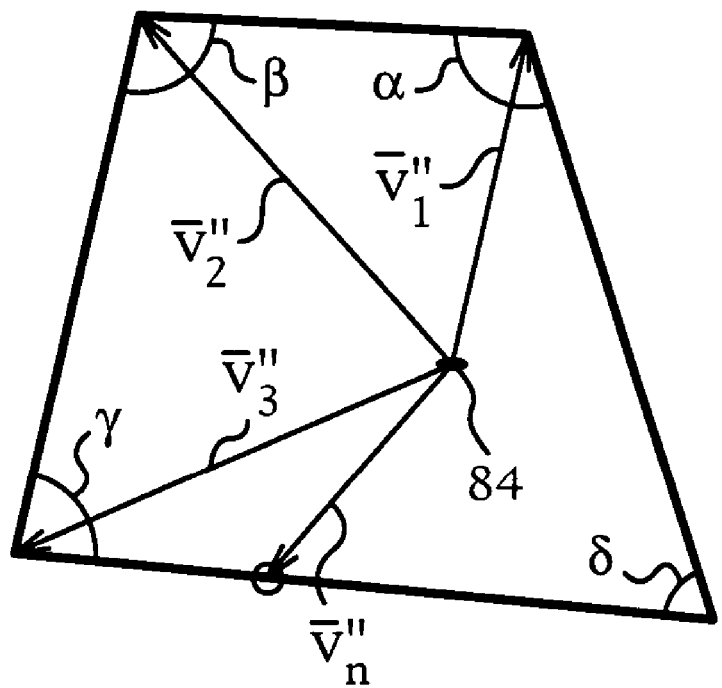

In the case where imaging optics 46 invert image 12' with respect to the physical orientation of jotting surface 12 image 12' needs to be inverted, as illustrated in FIG. 9. This inversion can be performed by transformation unit 70 at any point in time. For example, image 12' can be inverted before applying the above steps for determining θ and φ or after. If image 12' is not inverted, then no inversion needs to be performed.

Figure 10:
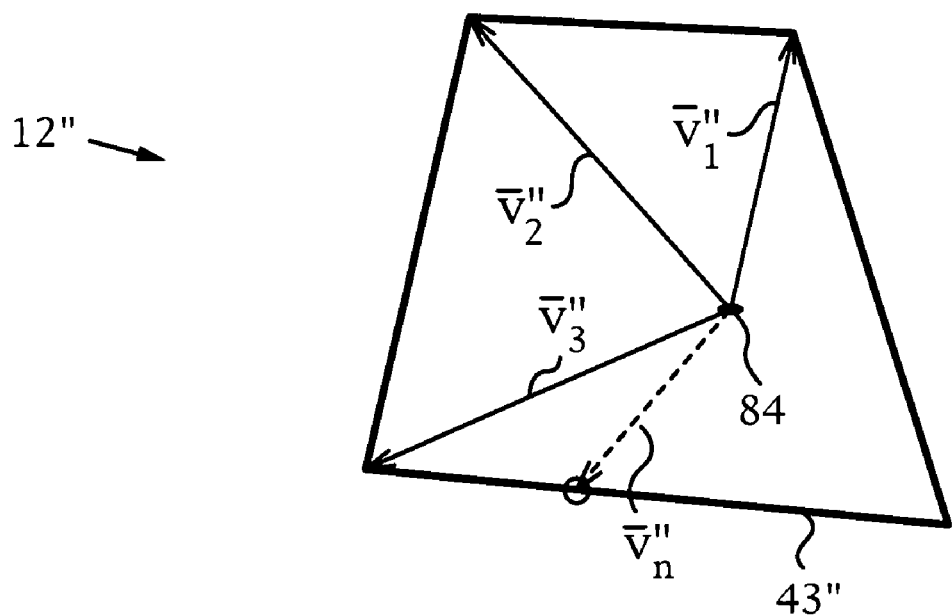
FIG. 10 is a diagram illustrating the parameterized corrected image.

A transformed and inverted (as necessary) image 12" is illustrated in FIG. 10. At this point vectors $v''_1$, $v''_2$ and $v''_3$ are re-computed. An additional vector $v''_n$ from center 84 to a feature or landmark on an edge 43" is also shown. Such landmark on edge 43 of jotting surface 12 can be used instead of a corner for determining the physical coordinates of nib 20.

This is especially important when two corners are obstructed by the user or any object(s) located between jotting surface 12 and optical unit 30.

Figure 11:
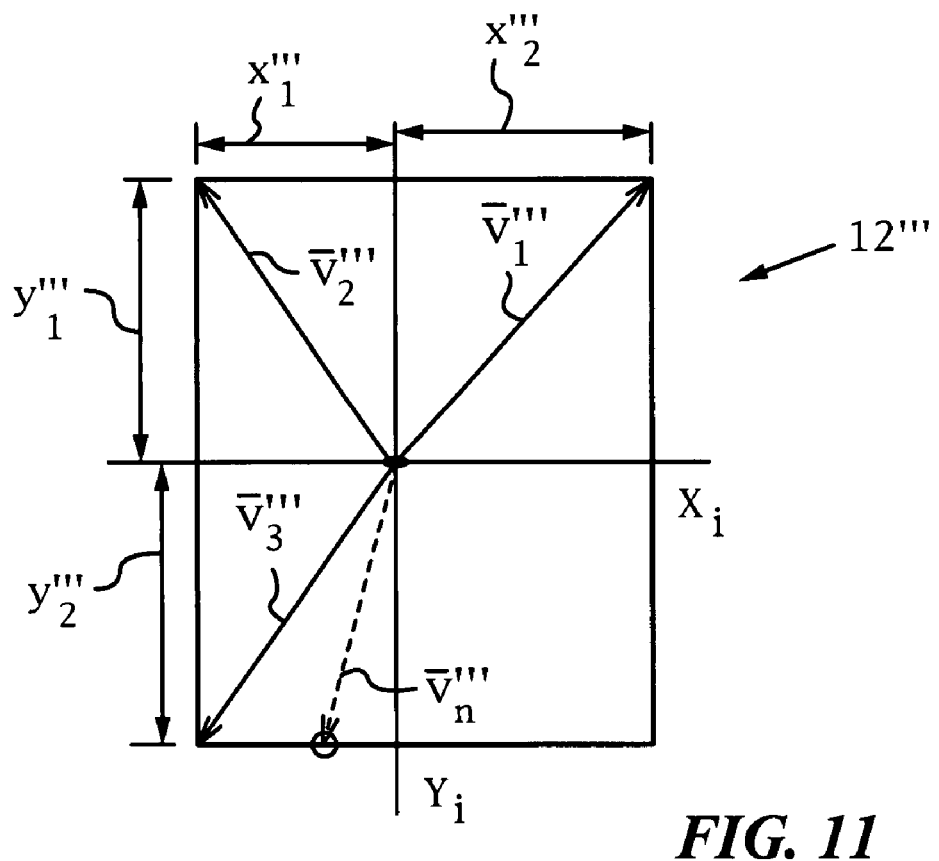
FIG. 11 is a diagram illustrating the parametrized, corrected and transformed image from which the physical coordinates of the nib are determined.

At this point image 12" is corrected for rotations by angles θ and φ to obtain final transformed and corrected image 12''', as shown in FIG. 11. This is done by applying the appropriate inverse rotations to transformed (and inverted, as the case may be) image 12". (These inverse rotations correspond to Euler rotations in physical space of jotting implement 10 with respect to jotting surface 12. Standard Euler transformation is described in any classical mechanics textbook such as Goldstein et al., Classical Mechanics, $3^{rd}$ Edition, Addison Wesley 2002).

Now the physical coordinates of nib 20 can be determined directly from vectors $v'''_1$, $v'''_2$, $v'''_3$ and/or vector $v'''_n$. This function is performed by ratio computation unit 72, which takes advantage of the fact that the proportions of image 12''' to jotting surface 12 are preserved. Specifically, computation unit 72 employs the following ratios:

$$\frac{x_1}{x_2} = \frac{x'''_1}{x'''_2}, \text{ and}$$

$$\frac{y_1}{y_2} = \frac{y'''_1}{y'''_2}.$$

Figure 12:
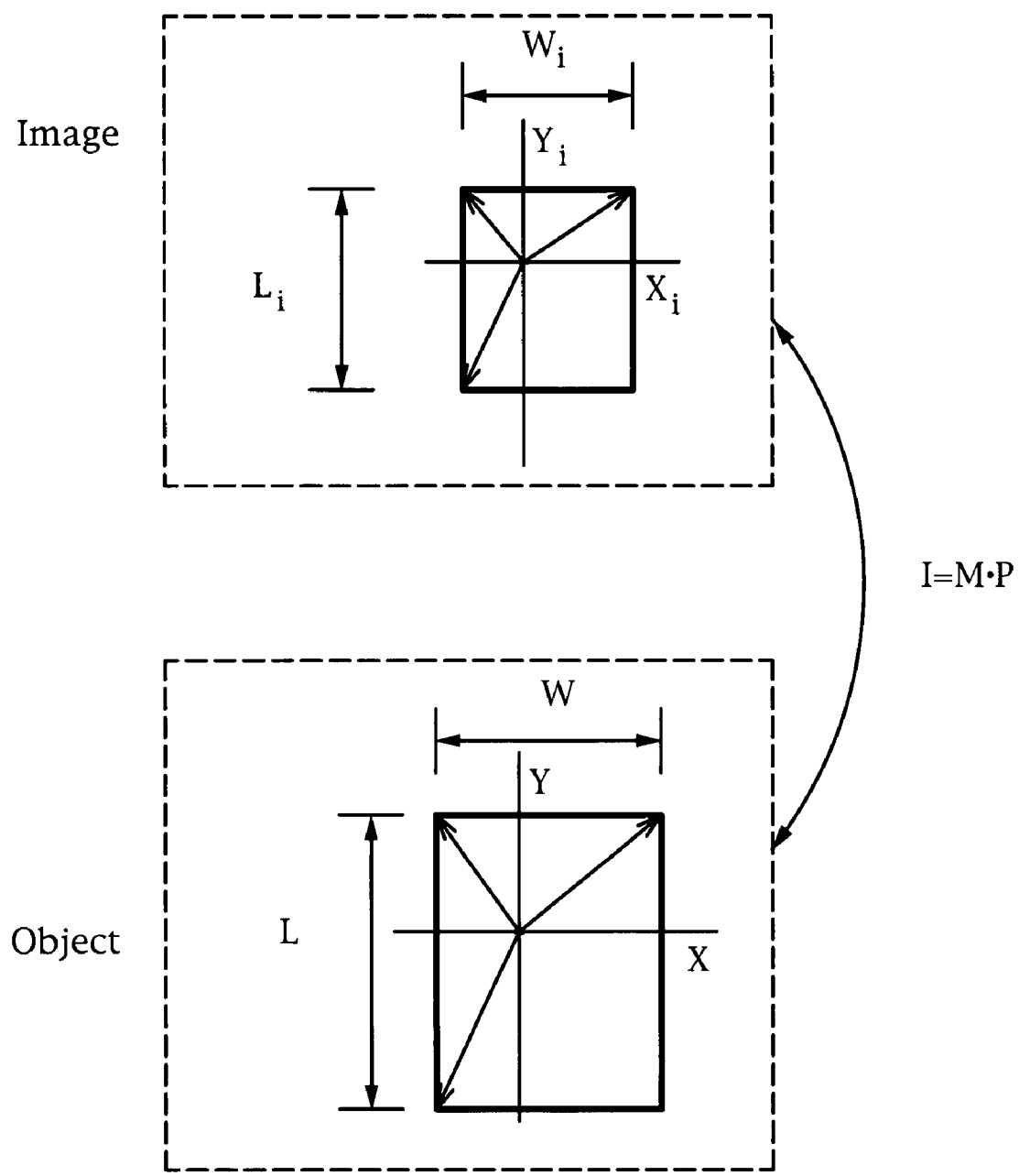
FIG. 12 is a diagram illustrating a correspondence between the image of the jotting surface and the physical jotting surface as can be used for initialization and cross-check purposes.

These values can be obtained from the vectors and the scaling factor due to the magnification M of imaging optics 46 can be used, as shown in FIG. 12 as an additional cross-check and constraint to ensure that the values obtained are correct.

Figure 13:
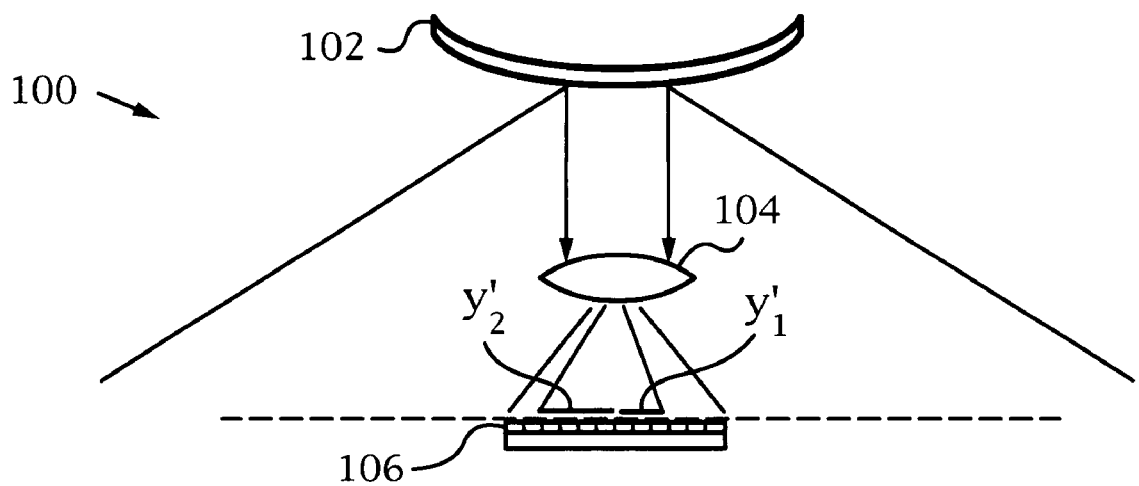
FIG. 13 illustrates another embodiment of an optical unit using a catadioptric system.
Figure 14:
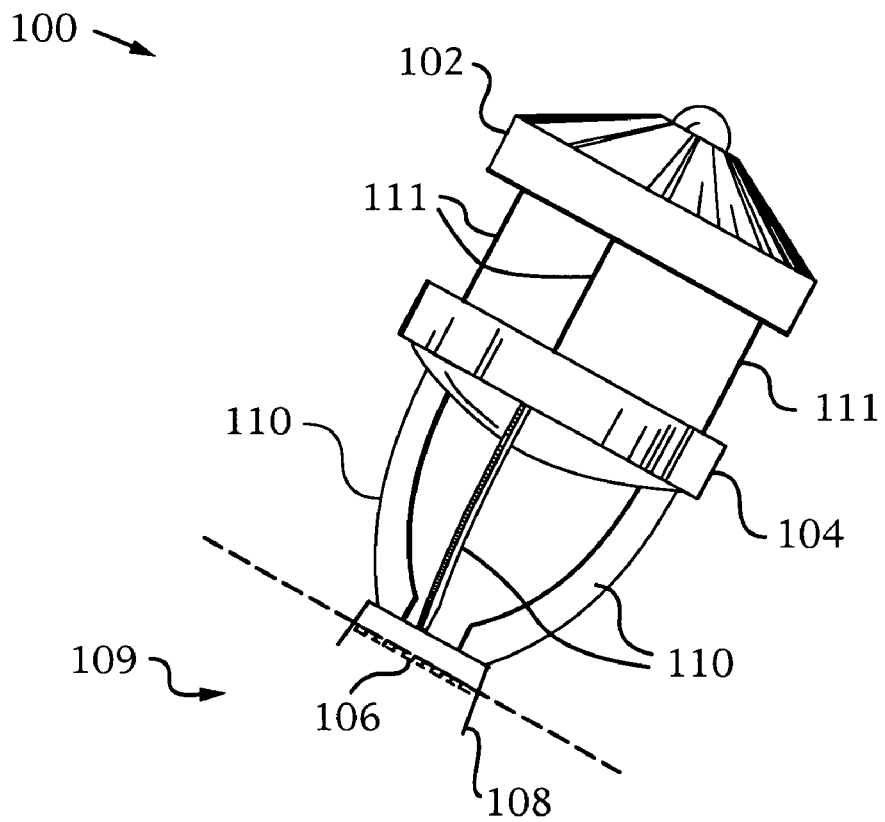
FIG. 14 illustrates the top portion of a writing implement employing the catadioptric system of FIG. 13.

Jotting implements according to the invention admit of numerous other embodiments. For example, an alternative optical unit 100 employing a catadioptic system with a parabolic (or hyperbolic) mirror 102 and a lens 104 is shown in FIG. 13. The construction of optical unit 100 has to be altered to accommodate optical unit 100 on a jotting implement 108 (only top part shown) as in FIG. 14. In this embodiment a photodetector array 106 is placed at a distal end 109 of a jotting implement 108. Support members 110 are extended with extensions 111 in this embodiment.

Figure 15:
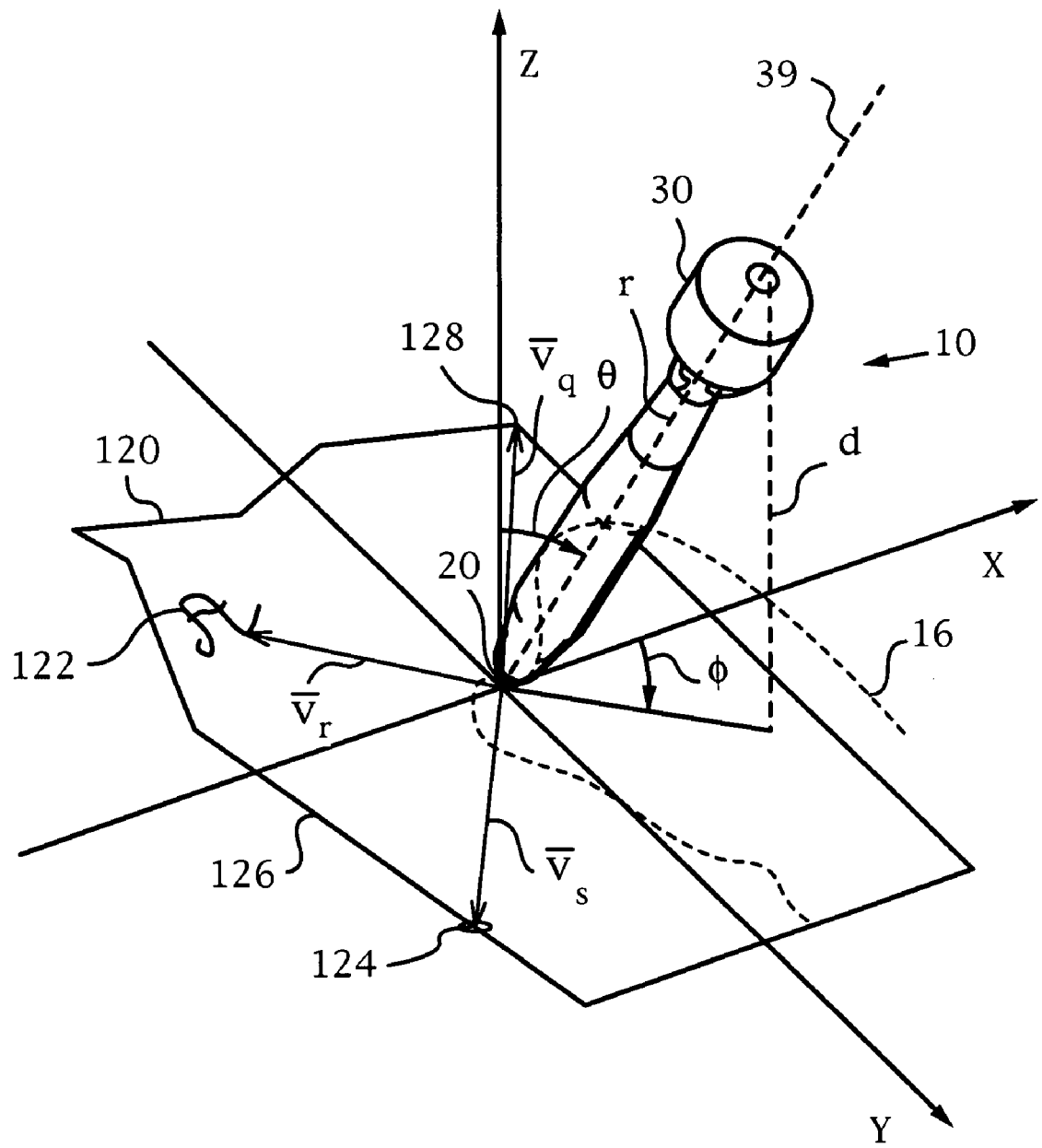
FIG. 15 is a three-dimensional diagram illustrating the use of alternative landmarks and features to determine the physical coordinates of the nib.

Jotting implement 10 can take advantage of features and landmarks other than corners and edges of a jotting surface 120. For example, as shown in FIG. 15, jotting implement takes advantage of a feature 122 produced by the user. Feature 122 is in fact a letter "A" written by the user. In the present case a particularly easy-to-locate point on the letter (e.g., a point yielding high contrast for easy detection and tracking) is used for tracking and a vector $v_r$ is constructed to this point from the origin of the Cartesian coordinate system. Jotting implement 10 also takes advantage of a landmark 124 located along an edge 126. A vector $v_s$ is constructed to landmark 124 from the origin. Finally, implement 10 uses a corner 128 of jotting surface 120 identified by corresponding vector $v_q$.

In this embodiment, during operation, edge detection algorithms described above and any other algorithms for detecting high-contrast points are applied to localize the lines and corners in the image and locate feature 122, landmark 124 and corner 128. Then, angles θ, φ are determined and the corresponding transformations applied to imaged vectors $v'_q$, $v'_r$ and $v'_s$ of the image of jotting surface 120, as described above. The physical coordinates of nib 20 are determined from the transformed vectors.

Of course, a person skilled in the art will recognize that the number of features and landmarks tracked will generally improve the accuracy of determining physical coordinates of nib 20 on jotting surface 120. Thus, the more landmarks and features are tracked, the more processing effort will be required. If real-time operation of jotting implement 10 is required, e.g., in cases where the jotting action is transmitted from jotting implement 10 to a receiver in real time, the number of features and landmarks should be limited. Alternatively, if the information jotted down can be downloaded by the user at a later time and/or no real-time processing is required, then more landmarks and features can be used to improve the accuracy with which the physical coordinates of nib 20 are determined. This will generally lead to an improved resolution of jotting surface 120. It should also be kept in mind, that the features and landmarks have to provide absolute references, i.e., their positions on jotting surface 120 can not change in time. However, it should be remembered that the landmarks or features being used for determining the physical coordinates of nib 20 need not be the same from frame to frame.

Figure 16:
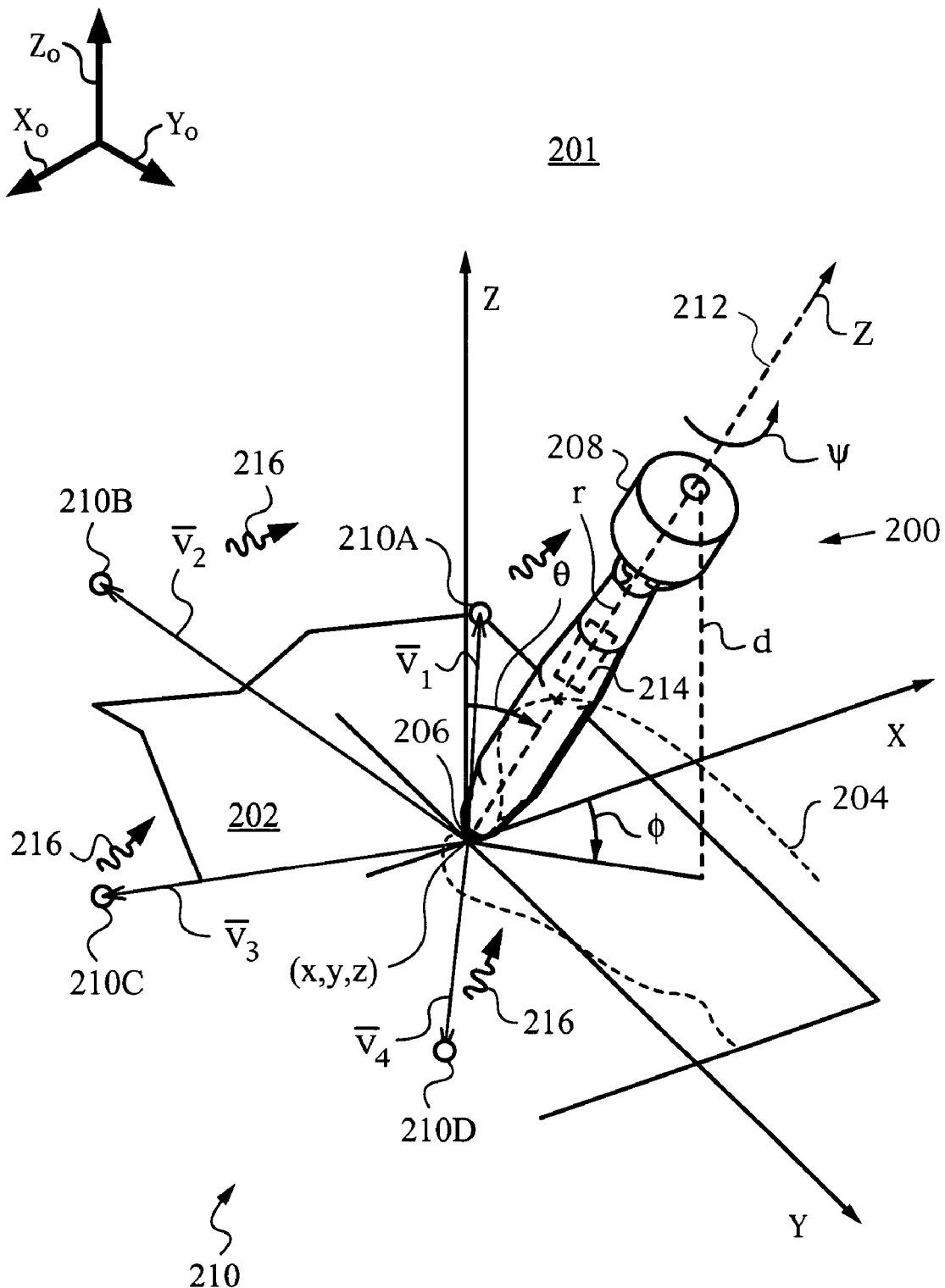
FIG. 16 is a three-dimensional diagram illustrating the use of four environmental landmarks to determine the physical coordinates of the nib.

FIG. 16 illustrates a jotting implement 200 for inferring information that is hand-jotted on a jotting surface 202. Implement 200 is held by a user's hand 204 in the same way as a conventional pen. Implement 200 has a nib 206 for jotting and an arrangement for determining when nib 206 is jotting on surface 202. The arrangement is not shown explicitly, but can be any of the above-mentioned types, including a piezoelectric pressure sensor or an on-off contact switch.

Jotting implement 200 has an optical unit 208 for viewing an environmental landmark 210 and jotting surface 202. In the present case landmark 210 is distributed and is formed by four distinct beacons 210A, 210B, 210C and 210D. Beacons 210A, 210B, 210C and 210D can be extended sources, such as illuminated screens, lamps, illuminated lines and the like, or they can be point-source type. In the present embodiment, beacons 210A, 210B, 210C and 210D are all point-source type light emitting diodes (LEDs) and are located at well-known locations in global coordinates ($X_o$, $Y_o$, $Z_o$). Preferably, an entire space of interest or workspace 201 including beacons 210A, 210B, 210C, 210D and jotting surface 202 are parameterized and indexed with respect to each other in global coordinates prior to operating implement 200.

The wavelengths of electromagnetic radiation 216 provided by LEDs 210A, 210B, 210C, 210D are selected to ensure optimum performance. For example, the wavelengths are selected outside the bandwidth of ambient radiation. For example, it is advantageous to select the wavelengths $\lambda_1$, $\lambda_2$, ..., $\lambda_n$ of electromagnetic radiation 216 emitted by LEDs 210A, 210B, 210C, 210D to reside in an infrared range. It is optional whether all wavelengths $\lambda_1, \lambda_2, \ldots, \lambda_n$ are different or equal. In some embodiments, different wavelengths can be used to differentiate between LEDs 210A, 210B, 210C, 210D. In the present embodiment, all LEDs 210A, 210B, 210C, 210D are infrared LEDs emitting at the same wavelength $\lambda_e$ equal to 950 nm. A suitable optical filter can be used by optical unit 208 to ensure that radiation 216 in the infrared range wavelength $\lambda_e$ is detected efficiently.

Optical unit 208 is indexed to nib 206 in such a way that an optical axis 212 of unit 208 passes through nib 206. This means that optical axis 212 is co-linear with the object Z axis or the center axis of implement 200 in object coordinates. Object coordinates prior to three counter-clockwise rotations by Euler angles (φ,θ,ψ) are typically indicated by primes, i.e., Z', Z" and Z''' (see e.g., Goldstein, op. cit.).

Jotting implement 200 has a processing unit 214 for receiving optical data of landmark 210 and jotting surface 202 from optical unit 208. From the optical data unit 214 determines the physical coordinates (x,y,z) of nib 206 with respect to jotting surface 202. In other words, unit 214 uses the optical data to determine the location of nib 206 in relationship to jotting surface 202. Preferably, physical coordinates (x,y,z) of nib 206 are expressed in global coordinates $(X_o, Y_o, Z_o)$.

Any suitable three-dimensional navigation algorithm can be used to determine coordinates (x,y,z) of nib 206. Of course, such algorithm involves implicit or explicit determination of the pose of implement 200 as expressed by Euler angles $(\phi,\theta,\psi)$. In other words, determination of coordinates (x,y,z) of nib 206 involves implicit or explicit computation of pose parameters $(x,y,z,\phi,\theta,\psi)$ of implement 200 by the navigation algorithm employed.

In one specific embodiment of the algorithm, the location of jotting surface 202 is determined from the point of view of optical unit 208 based on finding edges, corners and/or other features of jotting surface 202, as taught above. The location of nib 206 with respect to LEDs 210A, 210B, 210C and 210D is determined from vectors $v_1$, $v_2$, $v_3$ and $v_4$ as determined from the point of view of optical unit 208. Since LEDs 210A, 210B, 210C and 210D are positioned at known positions in workspace 201 the pose parameters $(x,y,z,\phi,\theta,\psi)$ can be determined based on projective, i.e., perspective geometry. In this approach the rules of perspective geometry using the concept of vanishing points lying on a horizon line can be applied to determine the location of the point of view of optical unit 208.

For example, if LEDs 210A, 210B, 210C and 210D are coplanar and lie on at least three straight intersecting lines framing a rectangular grid in the field of view F.O.V. of optical unit 208, then the navigation algorithm can find a horizon and conjugate vanishing points from which the point of view is determined. Once the point of view is known, pose parameters $(x,y,z,\phi,\theta,\psi)$ of implement 200 are determined. Initially, the point of view is the origin or reference point at (x,y,z). As mentioned above, any other point on implement 200, not just nib 206, can be used as the reference point based on a coordinate transformation. The perspective geometry and vector algebra necessary to perform absolute navigation are known to skilled artisans of optical image processing and will not be discussed herein. For more details, the reader is referred to K. Kanatani, "Geometric Computation for Machine Vision", Oxford Science Publications; Clarendon Press, Oxford; 1993, Chapters 2-3.

Once pose parameters $(x,y,z,\phi,\theta,\psi)$ of implement 200 in global coordinates $(X_o,Y_o,Z_o)$ are known, the physical coordinates of nib 206 with respect to jotting surface 202 can be determined. There are several modes for determining coordinates (x,y,z) of nib 206 with respect to surface 202 depending on several factors. The main factors are: whether jotting surface 202 and LEDs 210A, 210B, 210C, 210D are stationary; whether LEDs 210A, 210B, 210C, 210D are permanently indexed with respect to jotting surface 202; whether optical data from jotting surface 202 and any of its features is sufficient to obtain pose parameters $(x,y,z,\phi,\theta,\psi)$ without the additional optical data from LEDs 210A, 210B, 210C, 210D; and whether optical data from LEDs 210A, 210B, 210C, 210D is sufficient to obtain pose parameters $(x,y,z,\phi,\theta,\psi)$ without additional optical data from jotting surface 202 and/or any of its features.

In the example of FIG. 16, optical data from four LEDs 210A, 210B, 210C, 210D suffices to obtain pose parameters $(x,y,z,\phi,\theta,\psi)$ in global coordinates $(X_o,Y_o,Z_o)$ without the need for optical data from jotting surface 202 or any of its features. Therefore, if LEDs 210A, 210B, 210C, 210D are permanently indexed with respect to jotting surface 202 (location of jotting surface 202 is always known) then the navigation algorithm can rely on pose parameters $(x,y,z,\phi,\theta,\psi)$ computed based on optical data just from LEDs 210A, 210B, 210C, 210D in computing coordinates (x,y,z) of nib 206 with respect to jotting surface 202.

In an alternative embodiment, jotting surface 202 is a loose sheet of paper, meaning that a user can continuously adjust the location of jotting surface 202 within workspace 201 (e.g., on a table (not shown)). In this case the optical data from paper 202 is used by unit 214 to find the coordinates (x,y,z) of nib 206 with respect to paper 202 in paper coordinates. In order to determine the position of paper 202 and nib 206 in global coordinates $(X_o,Y_o,Z_o)$, optical data from stationary LEDs 210A, 210B, 210C, 210D has to be processed by unit 214. This yields coordinates (x,y,z) of nib 206 in global coordinates $(X_o,Y_o,Z_o)$. From these coordinates the location and orientation of paper 202 in global coordinates $(X_o,Y_o,Z_o)$ can be recovered by standard coordinate transformation well-known to those skilled in the art.

In situations where jotting surface 202 is stationary and LEDs 210A, 210B, 210C, 210D are permanently indexed to surface 202 the optical data from either or both can be used in determining coordinates (x,y,z) of nib 206 in global coordinates $(X_o,Y_o,Z_o)$. Selection of optical data to be used by unit 214 in recovering pose parameters $(x,y,z,\phi,\theta,\psi)$ and physical coordinates (x,y,z) of nib 206 in these cases is made on considerations of data rate, data quality, signal-to-noise and standard processing requirements.

Figure 17A:
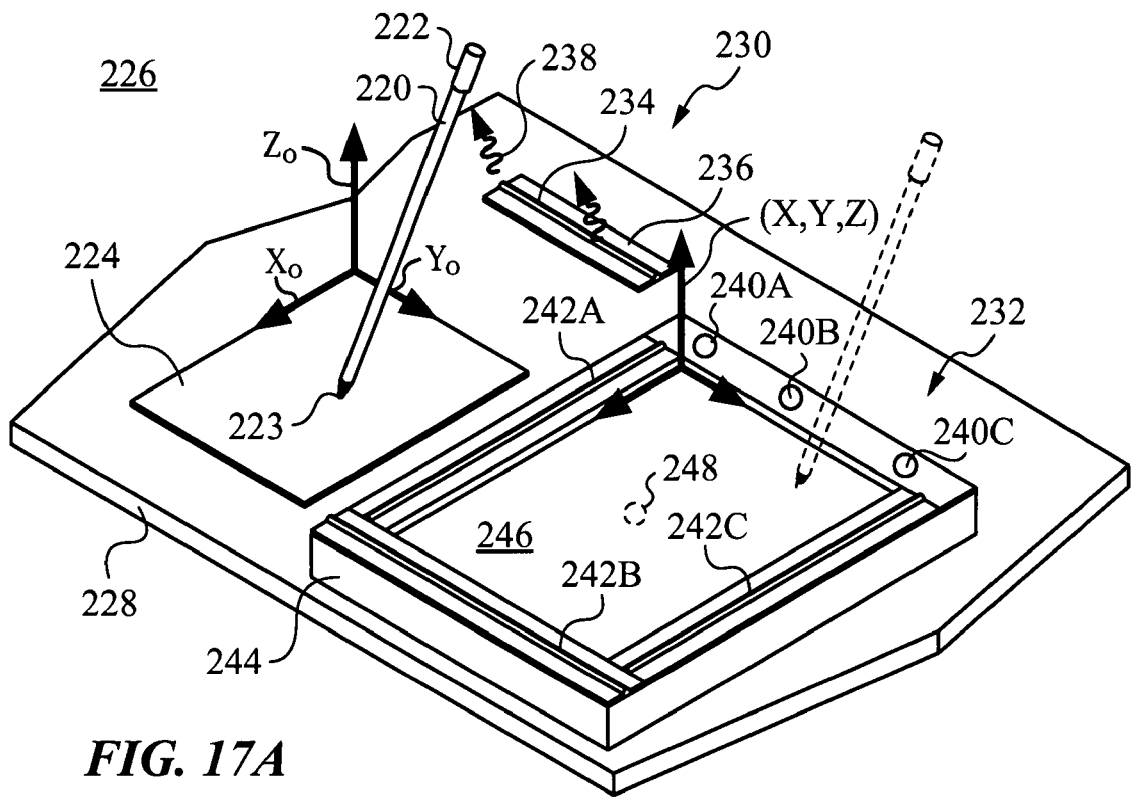
FIGS. 17A-B are three-dimensional diagrams illustrating the operation of a jotting implement in alternative workspace environments with environmental landmarks.

FIG. 17A is a simplified view of a jotting implement 220 with an optical unit 222 mounted atop and a nib 223 for jotting. In this embodiment global coordinates $(X_o,Y_o,Z_o)$ are the coordinates defined by a jotting surface 224. Surface 224 may be a loose sheet of paper, a bound notebook or some other convenient jotting surface—e.g., a rigid surface such as a clip-board or a graphic tablet. Surface 224 resides in a workspace 226 that includes a desktop 228.

Two environmental landmarks 230, 232 are used in this embodiment. Landmark 230 is a single extended source of illumination, specifically a line-source type beacon 234 affixed on a host structure 236 for emitting electromagnetic radiation 238. Structure 236 is a flat object that is easy to place on desktop 228. It is not necessary for host structure 236 to play any specific function or have any utility beyond bearing and supporting the operation of beacon 234. In the present case, however, structure 236 is also a ruler.

Landmark 232 has three point-source beacons 240A, 240B, 240C and three line-source beacons 242A, 242B, 242C affixed on a host structure 244. Structure 244 is a computing device such as a personal computer, a digital document reader or some other device with a display screen 246 for visually sharing information with a user. In a preferred embodiment, computing device 244 is an ultra-mobile portable computer such as a tablet PC in which screen 246 has been conditioned for supporting jotting activity. In other words, structure 244 incorporates its own jotting surface 246 that is stationary. In addition, all beacons 240A-C, 242A-C of landmark 232 surrounding screen and jotting surface 246 are stationary and permanently indexed to jotting surface 246 in screen coordinates (X,Y,Z). Note, however, that beacons 240A-C, 242A-C of landmark 232 are not permanently indexed to jotting surface 224. Also, since ruler 236 can be placed anywhere on desktop 228, beacon 234 of landmark 230 is not permanently indexed to either jotting surface 224 or jotting surface 246.

Whenever the host structure has a screen, it is possible to mount or affix one or more beacons behind the screen in a manner unobtrusive to the user. In some cases, all beacons can be affixed behind the screen to conserve space. In the present example, a beacon 248 is affixed behind screen 246.

A person skilled in the art will recognize that multiple internal reflections, parallax and other optical effects have to be taken into account and/or mitigated when mounting beacon 248 behind screen 246.

Optical unit 222 captures optical data from jotting surfaces 224, 246 and from landmarks 230, 232. A processing unit (not shown) receives the optical data and computes pose parameters $(x,y,z,\phi,\theta,\psi)$ of implement 220. Depending on application and/or as desired, pose parameters $(x,y,z,\phi,\theta,\psi)$ can be expressed in global coordinates $(X_o,Y_o,Z_o)$ defined by jotting surface 224 or in screen coordinates (X,Y,Z). Thus, physical coordinates (x,y,z) of nib 223 can be expressed with respect to either jotting surface 224 or screen 246. Note that since pose parameters $(x,y,z,\phi,\theta,\psi)$ include z-axis and angular information implement 220 can operate in three dimensions as a pen-mouse-pointer all-in-one mode. The transition between jotting mode and mouse/pointer mode is signaled by the mechanism that determines when nib 223 is jotting.

Figure 17B:
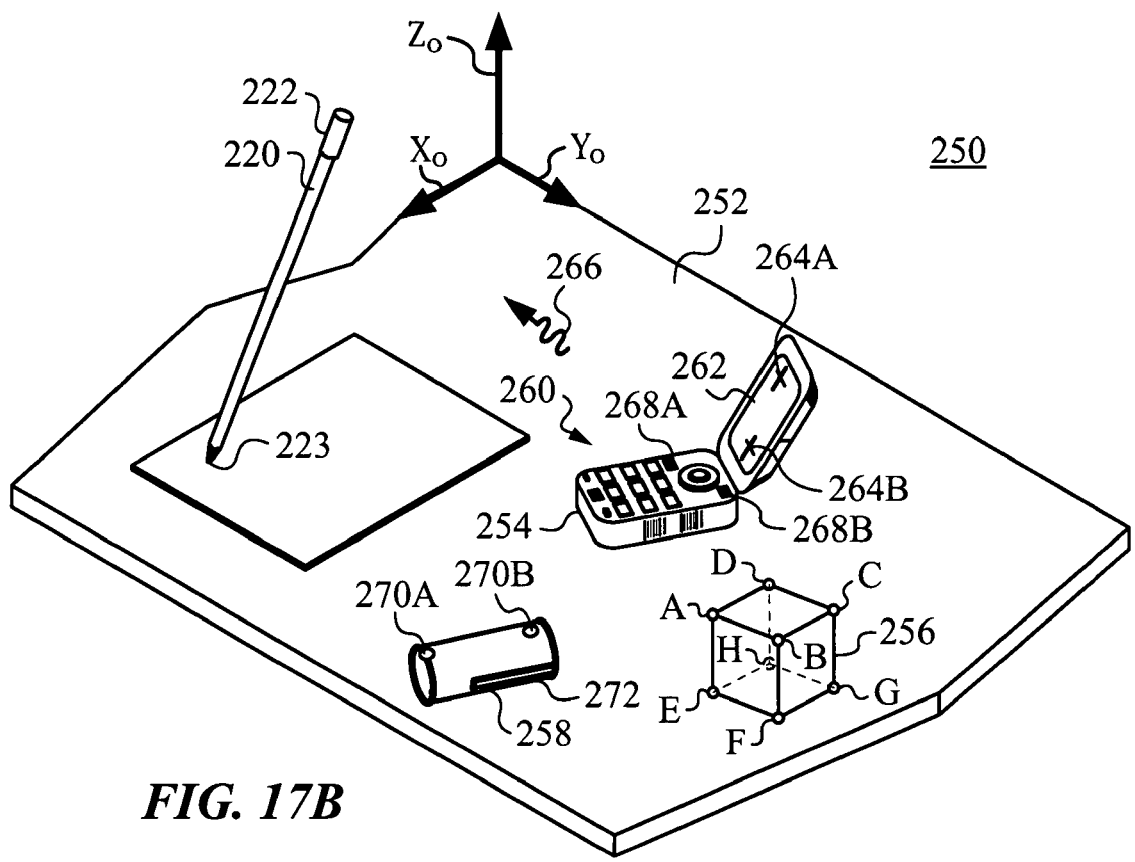

FIG. 17B illustrates jotting implement 220 used in another workspace 250 on a desk 252 that plays the role of a large format jotting surface in conjunction with several host structures 254, 256, 258. Global coordinates $(X_o,Y_o,Z_o)$ in this embodiment are defined by the surface of desk 252 given that its dimensions are known. With this coordinate choice pose parameters $(x,y,z,\phi,\theta,\psi)$ of jotting implement 220 are expressed directly in desk coordinates. Expressing three-dimensional coordinates (x,y,z) of nib 223 and Euler angles $(\phi,\theta,\psi)$ of implement 220 with respect to the fixed surface of desk 252 is advantageous for many reasons, including stability of the coordinate system.

Host structure 254 is a communication device, specifically a cell phone with a keypad 260 and a screen 262. Of course, any smart phone, personal digital assistant (PDA) or other smart communication device can play the role of host structure 254. It should be noted that screen 262 can be used as a jotting surface in this embodiment. A first environmental landmark is also formed by screen 262 which supports several displayed beacons 264A, 264B. Beacons 264A, 264B can be specially designated pixels, pixel clusters or just regular pixels belonging to screen 262 that emit electromagnetic radiation 266 at a certain wavelength that the optical unit 222 is expecting. Alternatively, separate LEDs 268A, 268B or even illuminated keys of keypad 260 can serve the function of beacons.

In general, beacons can be placed in various patterns and various planes—e.g., in a plane that is perpendicular to, coplanar with or parallel to any particular jotting surface. In the case of screen 262 beacons 264A, 264B are is a single plane that is slightly offset from but parallel to screen 262. On the other hand, host structure 256 has eight point-source beacons A-H in a three-dimensional cubic arrangement. Specifically, beacons A-H are affixed at the corners of host structure 256. This yields a very useful Manhattan-arrangement of beacons A-H that will be recognized as very advantageous for recovery of pose parameters $(x,y,z,\phi,\theta,\psi)$ by a person skilled in the art of optical navigation.

Host structure 258 is a pen-cap with two beacons 270A, 270B affixed along its top. A clip 272 is mounted and weighted to ensure that when pen-cap 258 is put down on desk 252 it will roll into a position where both beacons 270A, 270B are facing up and are thus visible to optical unit 222.

During operation, physical coordinates (x,y,z) of nib 223 are expressed in desk coordinates $(X_o,Y_o,Z_o)$. For this purpose, optical unit 222 views edges, corners and other fixed features of desk 252. In addition, optical unit 222 also views any of environmental landmarks 254, 256, 258 that are in its field of view. Based on optical data from desk 252 and landmarks 254, 256, 258 the navigation algorithm implemented by the processing unit determines the physical coordinates (x,y,z) of nib 223 in desk coordinates $(X_o,Y_o,Z_o)$. While performing this operation, the processing unit may map out the locations of landmarks 254, 256, 258 on desk 252 and use them for auxiliary data to make its computation more robust. Of course, when any of the landmarks 254, 256, 258 are moved the processing unit needs to perform a recalibration to take into account the new locations of the landmarks on desk 252.

When the nib is jotting on a jotting surface 274 such as a sheet of paper placed on desk 252 or on the large format jotting surface formed by desk 252 itself, the hand-generated information is preferably rendered into a trace (sometimes also called digital ink). On the other hand, when nib 223 is in the air, i.e., when nib 223 is not jotting the hand-generated information is rendered into a pointer location that can be projected onto an active jotting surface. This can be done, e.g., when using screen 262 as the jotting surface.

It should be noted that the mode in which the pointer location is projected onto screen 262 does not need to be absolute—it is sufficient for the mode to be quasi-absolute. In such mode the pointer location is absolute with respect to some of the beacons, in particular beacons 264A, 264B that are indexed to screen 262, but relative with respect to entire jotting surface 252. In other words, while cooperating with screen 262 only absolute physical coordinates (x,y,z) of nib 223 in global coordinates $(X_o,Y_o,Z_o)$ do not need to be computed. When emulating a standard mouse, it is not necessary to provide quasi-absolute position—merely tracking relative changes in nib position is sufficient.

In contrast to prior art, the implement of the invention infers the physical coordinates of the nib indirectly, i.e., from the optical data of the jotting surface and the environmental landmark obtained from the optical unit. Any optical data about the jotting surface sufficient to determine the physical coordinates of the nib can be used. In the case of desk 252 optical data of all corners or a number of corners, edges or portions thereof as well as any optically recognizable features including marks, ink spills, physical imperfections and the like can be used. The optical data from the jotting surface and environmental landmarks can be used jointly or separately. If the amount of optical data is insufficient to determine the physical coordinates (x,y,z) of the nib in any particular fixed coordinates, then the physical coordinates (x,y,z) can be provided in relative rather than absolute format, e.g., as rates of change $$\left(\frac{dx}{dt}, \frac{dy}{dt}, \frac{dz}{dt}\right).$$

It will be evident to a person skilled in the art that the present invention admits of various other embodiments. The implement of the invention can be used as an absolute, quasi-absolute or relative position mouse, a pointer, a pen, a stylus, a three-dimensional digitizer wand, a remote controller and a general input device. The implement can operate in conjunction with any appliance that may itself serve as a host structure for beacons. Because of the multitude of alternative embodiments the scope of the invention should be judged by the appended claims and their legal equivalents.

The invention claimed is:

1. A jotting implement for inferring hand-jotted information on a jotting surface, said jotting implement comprising:
   a) a nib for jotting;
   b) a means for determining when said nib is jotting on said jotting surface;
   c) an optical unit for viewing an environmental landmark and said jotting surface, said optical unit being indexed to said nib; and
   d) a processing unit for receiving optical data from said environmental landmark and said jotting surface from said optical unit and for determining from said optical data physical coordinates of said nib with respect to said jotting surface.

2. The jotting implement of claim 1, wherein said environmental landmark comprises at least one beacon for providing an electromagnetic radiation.

3. The jotting implement of claim 2, wherein said at least one beacon is affixed to a host structure.

4. The jotting implement of claim 3, wherein said host structure is selected from the group consisting of computing devices, communication devices, clip-boards, tablet PCs graphic tablets and workspace devices.

5. The jotting implement of claim 4, wherein said host structure comprises said jotting surface and said at least one beacon is indexed to said jotting surface.

6. The jotting implement of claim 3, wherein said host structure comprises a screen and said at least one beacon is affixed behind said screen.

7. The jotting implement of claim 2, wherein said at least one beacon comprises a number of beacons in a three-dimensional arrangement.

8. The jotting implement of claim 7, wherein said three-dimensional arrangement is a Manhattan arrangement.

9. The jotting implement of claim 2, wherein said at least one beacon comprises a light emitting element that emits said electromagnetic radiation at an infrared wavelength.

10. The jotting implement of claim 9, wherein said light element comprises a point-source.

11. The jotting implement of claim 10, wherein said light emitting element comprises a light-emitting-diode.

12. A jotting implement for inferring hand-generated information with respect to a jotting surface, said jotting implement comprising:
   a) a nib for jotting;
   b) a means for determining when said nib is jotting on said jotting surface;
   c) an optical unit for viewing an environmental landmark and said jotting surface, said optical unit being indexed to said nib; and
   d) a processing unit for receiving optical data from said environmental landmark and said jotting surface from said optical unit and for determining from said optical data physical coordinates of said nib with respect to said jotting surface.

13. The jotting implement of claim 12, wherein said hand-generated information is rendered into a trace when said nib is jotting on said jotting surface.

14. The jotting implement of claim 12, wherein said hand-generated information is rendered into a pointer location projected onto said jotting surface when said nib is not jotting on said jotting surface.

* * * * *